(12) United States Patent
Nemugaki et al.

(10) Patent No.: US 6,722,160 B1
(45) Date of Patent: Apr. 20, 2004

(54) METHOD FOR AIR-COOLED REINFORCING OF GLASS SHEET

(75) Inventors: Yoichi Nemugaki, Aichi (JP); Masanori Tomioka, Aichi (JP); Ken Nomura, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 264 days.

(21) Appl. No.: 09/763,235

(22) PCT Filed: Jun. 16, 2000

(86) PCT No.: PCT/JP00/03967

§ 371 (c)(1),
(2), (4) Date: Feb. 20, 2001

(87) PCT Pub. No.: WO00/78685

PCT Pub. Date: Dec. 28, 2000

(30) Foreign Application Priority Data

Jun. 17, 1999 (JP) ............................................. 11-171140
Jun. 17, 1999 (JP) ............................................. 11-171143

(51) Int. Cl.[7] ............................................. C03B 27/044
(52) U.S. Cl. ............................. 65/114; 65/348; 65/351
(58) Field of Search ........................... 65/111, 114, 115, 65/348, 351, 118, 104, 268; 34/406, 413, 414, 60; 125/61

(56) References Cited

U.S. PATENT DOCUMENTS

| | | | | |
|---|---|---|---|---|
| 3,372,016 A | * | 3/1968 | Rahrig et al. | 65/114 |
| 3,406,022 A | * | 10/1968 | Gehenot | |
| 4,230,474 A | * | 10/1980 | Roth et al. | 65/114 |
| 4,343,645 A | * | 8/1982 | Abe | 65/348 |
| 4,400,194 A | * | 8/1983 | Starr | 65/114 |
| 4,820,327 A | * | 4/1989 | Letemps et al. | 65/104 |
| 4,957,528 A | * | 9/1990 | Letemps et al. | 65/104 |
| 5,009,693 A | | 4/1991 | Freidel et al. | |
| 5,125,948 A | * | 6/1992 | Vanaschen et al. | 65/348 |
| 5,846,281 A | * | 12/1998 | Nikander et al. | 65/114 |
| 6,397,634 B1 | * | 6/2002 | Takeda et al. | 65/102 |
| 6,412,309 B1 | * | 7/2002 | Kajii et al. | 65/348 |
| 6,513,348 B2 | * | 2/2003 | Shetterly et al. | 65/104 |

FOREIGN PATENT DOCUMENTS

| | | |
|---|---|---|
| JP | 10-287438 | 10/1998 |
| JP | 11-147728 | 6/1999 |

* cited by examiner

Primary Examiner—Steven P. Griffin
Assistant Examiner—Carlos Lopez
(74) Attorney, Agent, or Firm—Oblon, Spivak, McClelland, Maier & Neustadt, P.C.

(57) ABSTRACT

An air-cooling/tempering device for a glass plate capable of providing uniform cooling performance and an air-cooling/tempering method for a glass plate capable of air-cooling and tempering efficiently are presented.

4 Claims, 11 Drawing Sheets

METHOD FOR AIR-COOLED REINFORCING OF GLASS SHEET

TECHNICAL FIELD

The present invention relates to an air-cooling/tempering device and an air-cooling/tempering method for a glass plate used for transporting machines such as automobiles, ships, railways, airplanes and so on or other various usage such as buildings and so on.

BACKGROUND ART

There has been known a method for bend-shaping a glass plate by transferring a glass plate heated to around a softening temperature in a heating furnace on a roller conveyor comprising a plurality of curved rollers (in, for example, U.S. Pat. No. 4,123,246). According to this method, the softened glass plate falls by its own weight, so that the glass plate is bent to meet the curvature of the rollers. In this case, the glass plate is bend-shaped in a direction perpendicular to a transferring direction of the glass plate.

In description, bend-shaping in a direction perpendicular to a transferring directions means that the shape of a bend-shaped glass plate is a shape curved around the axis of the transferring direction. In other words, the bend-shaped glass plate has a curved shape in cross section taken vertically along the axis of the transferring direction. "Bend-shaping along a transferring direction" means similarly that the shape of a bend-shaped glass plate is a shape curved around the axis perpendicular to the transferring direction. In other words, the bend-shaped glass plate has a curved shape in cross section taken vertically along the axis perpendicular to the transferring direction. With respect to the shape of a curved plane formed by a plurality of rollers as described hereinbelow, "curved in (along) a transferring direction", "curved in a transferring direction" or the like have the same meaning as "bend-shaped in (along) a transferring direction". Also, in description of the curved plane concerning a direction perpendicular to a transferring direction, the same meaning as "bend-shaped in a direction perpendicular to a transferring direction" should be taken.

In this description, "perpendicular to a certain direction" means a direction perpendicular to a certain direction on a horizontal plane. Further, "upper" or "lower" in this description means "upper" or "lower" with respect to a horizontal plane.

In automobile industries in recent years, a demand of production of small quantity and large variety has been increasing, and glass plates having various curvatures are needed so as to correspond to models of automobiles. In a method described in U.S. Pat. No. 4,123,246 (hereinbelow, referred to simply as the '246 method), it was necessary to exchange rollers to those having a curvature corresponding to a model of automobile. The exchanging took much time, and it was necessary to prepare rollers having a curvature required for the model.

Further, in the '246 method, glass plates are transferred in a direction perpendicular to a direction to be bent. In this case, in bend-shaping a glass plate for a side window of an automobile for instance, the direction of a side of the glass plate when it is fitted to an automobile, corresponds to the direction of extending of the rollers. Accordingly, a stripe-like roller strain due to the contact of the rollers to the glass plate is formed in a vertical direction in a state of being assembled, and therefore, the stripe-like strain by the rollers is apt to be conspicuous. With respect to this, detailed description will be made hereinbelow.

When a glass plate is transferred by means of rollers, a so-called roller strain is formed by the contact of the glass plate with the rollers. Each of the rollers is extended in a direction perpendicular to the transferring direction, and they are arranged adjacently in the transferring direction. Therefore, the roller strain is formed in a stripe form in a direction perpendicular to the transferring direction of the glass plate.

Usually, it is difficult to find the roller strain by human eyes, and the roller strain is never an obstacle to visibility in use. However, it is seldom to find the roller strain depending on a condition of use and light incident to the glass plate. For example, a stripe-like strain extending in a vertical direction of a glass plate in a state that the glass plate is assembled to an automobile is easy to see in comparison with a stripe-like strain extending in a horizontal direction in an assembled state. Accordingly, it is preferred to make the transferring direction of the glass plate to be bend-shaped coincident with a horizontal direction in an assembled state.

On the other hand, when a glass plate is bend-shaped along the transferring direction, the thickness in apparent of the glass plate viewed from the frontage of an air-cooling/tempering device becomes large. Accordingly, in a conventional air-cooling/tempering device for a glass plate, a large frontage is required. When the frontage is made large, the distance between the air-blowing ports of the air-cooling/tempering device and the surface of the glass plate is large whereby the cooling performance is reduced.

As a bend-shaping method for a glass plate wherein the transferring direction of the glass plate to be bend-shaped is made coincident with the horizontal direction in an assembled state, and the frontage for introducing glass plates in the air-cooling/tempering device is made small, the method as described in U.S. Pat. No. 4,820,327 is known. According to this method, a glass plate is bend-shaped by heating the glass plate to around a softening temperature in a heating furnace and transferring the glass plate by means of a plurality of rollers arranged with an inclination in the transferring direction so as to curve the transferring path. In this method (hereinbelow, referred to as the '327 method), since the softened glass falls by its own weight, the glass plate is bent to meet a curvature of the transferring path. In this case, the glass plate is bend-shaped in the transferring direction.

In the '327 method, however, it was necessary to change the arrangement of rollers so as to form a transferring path having a curvature which meets a specified model among various models. The exchange took much time. Further, in the '327 method, the transferring direction of the glass plate is changed to a vertical direction. Therefore, the entire equipment used for the '327 method is inevitably large. Further, the transferring direction of the glass plate has to be changed from the vertical direction to the horizontal direction whereby a complicated mechanism is needed.

The glass plate bend-shaped as described above is, then, transferred to the air-cooling/tempering device in which air-cooling and tempering are effected. In this case also, the glass plate is air-cooled and tempered while it is transferred by a roller conveyor. Namely, the glass plate is transferred by the roller conveyor, wherein in such transferring process, the glass plate is air-cooled and tempered by blowing air to its upper and lower faces through air-blowing heads arranged upper and lower sides of the roller conveyor. In this case, the air-cooling/tempering device is preferably so adapted that the blowing of air is started when the entirety of the glass plate has completely been transferred between the upper and lower air-blowing heads so that the entire surface of the glass plate can uniformly be air-cooled and tempered. Namely, the air-cooling/tempering device is formed such that the blowing of air is started when the entirety of the glass plate is transferred between the upper and lower air-blowing heads, and the blowing of air is stopped when the glass plate is completely passed through the air-blowing heads. Then, the blowing of air is started again when the next glass plate to be air-cooled and tempered is, in its entirety, completely transferred between the upper and lower air-blowing heads.

However, the conventional method has a weak point such that in air-cooling and tempering the glass plate, another glass plate to be subsequently air-cooled and tempered can not be transferred between the upper and lower air-blowing heads until the glass plate subjected at present to air-cooling and tempering is completely passed between the upper and lower air-blowing heads, whereby, certain intervals of time is necessary for transferring. As a result, there was a drawback that glass plates can not effectively be air-cooled and tempered.

The present invention has been made in consideration of the above-mentioned, and the object of the present invention is to provide an air-cooling/tempering device for a glass plate, which can provide uniform cooling performance.

Further, it is an object to provide an air-cooling/tempering method for a glass plate, which can effectively air-cool and temper glass plates.

DISCLOSURE OF THE INVENTION

According to an aspect of the present invention, there is provided an air-cooling/tempering device for a glass plate which comprises a plurality of rollers for transferring a bend-shaped glass plate and for curving a transferring plane so as to correspond to a curved shape of the glass plate by being moved vertically; a plurality of upper air-blowing heads each disposed at an upper side between each adjacent rollers to blow air to an upper face of the glass plate transferred by the plurality of rollers; a plurality of lower air-blowing heads each disposed at a lower side between each adjacent rollers to blow air to a lower face of the glass plate transferred by the plurality of rollers; and an air-blowing head moving mechanism for moving vertically the upper air-blowing heads and the lower air-blowing heads depending on a vertical position of the plurality of rollers in a state that the distance between an upper air-blowing head and the lower air-blowing head opposing the upper air-blowing head is kept to be constant.

According to this, the upper air-blowing heads and the lower air-blowing heads are moved vertically in response to the vertical movement of the rollers, whereby uniform cooling performance can be provided.

Further, according to an aspect of the present invention, there is provided an air-cooling/tempering device for a glass plate which comprises a plurality of rollers disposed at predetermined intervals and supported by movable frames capable of moving vertically so as to move individually in a vertical direction to transfer a bend-shaped glass plate; upper air-blowing heads each disposed at an upper side between each adjacent rollers to blow air to an upper face of the glass plate; lower air-blowing heads each disposed at a lower side between each adjacent rollers to blow air to a lower face of the glass plate; a plurality of upper supporting frames attached with the upper air-blowing heads and supported to be capable of sliding in a vertical direction; a plurality of lower supporting frames attached with the lower air-blowing heads and supported to be capable of sliding in a vertical direction; pivot shafts each provided on each of the movable frames; disk-like pieces each provided on the same axis as the pivot shaft; swing arms each disposed between adjacent pivot shafts so that an end is supported rotatably by a pivot shaft at one side and the other end is supported by the pivot shaft at the other side; connecting arms each having an end connected to one of the lower supporting frames and the end connected to a central portion of one of the swing arms; and driven arms each having an end connected to one of the upper supporting frames and the other end mounted on an upper face of a central portion of one of the swing arms, wherein the plurality of rollers at a position where the glass plate is transferred are moved vertically with the transfer of the glass plate so that a curved plane is formed in the transferring plane formed by the plurality of rollers at that position, the curved plane being curved in a transferring direction so as to correspond to the shape of the glass plate bend-shaped; each of the rollers are sequentially moved vertically with the transfer of the glass plate and the curved plane is shifted in the transferring direction of the glass plate with the transfer of the glass plate; and the upper air-blowing heads and the lower air-blowing heads each disposed between each adjacent rollers are moved vertically so as to correspond to the vertical movement of the glass plate to transfer the bend-shaped glass plate and at the same time, to blow air to the upper and lower faces of the glass plate to thereby air-cooing and tempering the glass plate.

According to this, the upper air-blowing heads and the lower air-blowing heads are moved vertically in response to the vertical movement of the rollers. Namely, the vertical movement of the rollers causes the vertical movement of the pieces by the same quantity of movement as the rollers. When these pieces are moved vertically, there occurs a difference of height between adjacent pieces whereby the swing arms are inclined. The lower air-blowing heads are connected to the arms via the connecting arms with the result that the upper air-blowing heads are moved vertically in connection with the swing motion of the swing arms. In this case, since the connecting arms are placed at a central portion of the swing arms, the quantity of movement of the upper air-blowing heads is ½ as much as the difference of height between adjacent rollers. Further, the upper air-blowing heads are connected to the arms via the driven arms with the result that the upper air-blowing heads are moved vertically in connection with the swing motion of the swing arms. In this case, since the connecting arms are placed at a central portion of the swing arms, the amount of movement of the upper air-blowing heads is ½ as much as the difference of height between adjacent rollers. Accordingly, the upper air-blowing heads and the lower air-blowing heads are moved vertically in response to the vertical movement of the rollers, and their positions are kept to be an intermediate level between the adjacent rollers. With this, uniform cooling performance can be provided.

Further, according to an aspect of the present invention, there is provided an air-cooling/tempering method for a glass plate for air-cooling and tempering the glass plate by blowing air to an upper face and a lower face of the glass plate transferred sequentially by means of a transferring means through air-blowing heads disposed along the transferring means, which comprises using the air-blowing heads in which the air-blowing area is divided into a plurality of areas along a transferring direction of the transferring means; a step of stopping the blowing of air in the air-blowing area at an uppermost stream side in the transferring direction from the beginning of the transfer of a portion of the glass plate into the air-blowing area at the uppermost stream side in the transferring direction in the air-blowing head to the transfer of the entirety of the glass plate; a step of blowing air in the air-blowing area at the uppermost stream side in the transferring direction from the transfer of the entirety of the glass plate into the air-blowing area at the uppermost stream side in the transferring direction to the transfer of the glass plate to a downstream side of the air-blowing area at the uppermost stream side in the transferring direction; and a step of stopping the blowing of air in the air-blowing area at the uppermost stream side in the transferring direction after the entirety of the glass plate has been transferred from the air-blowing area at the uppermost stream side in the transferring direction.

Further, according to an aspect of the present invention, there is provided an air-cooling/tempering method for a glass plate for air-cooling and tempering the glass plate by blowing air to an upper face and a lower face of the glass plate transferred sequentially by means of a transferring means through air-blowing heads disposed along the transferring means, wherein the air-blowing head has an air-blowing area which is divided into a first area at an upper stream side in the transferring direction of the transferring means and a second area at a downstream side thereof, and wherein a step of blowing air in the first and second areas when the entirety of the glass plate is transferred into the first area, a step of stopping the blowing of air in the first area when the entirety of the glass plate is passed through the first area, and a step of reopening the blowing of air in the first area when the next glass plate is transferred into the first area to which the blowing of air has been stopped, are repeated sequentially.

According to this, when the entirety of the glass plate transferred by means of the transferring means is transferred into the first area, air is blown into the first area and the second area. When the entirety of the glass plate is passed through the first area, the blowing of air in the first area is stopped, and another glass plate to be subsequently air-cooled and tempered is transferred into the first area to which the blowing of air is stopped. Accordingly, time intervals for transferring glass plates can be shortened whereby the glass plates can effectively be air-cooled and tempered.

Further, according to an aspect of the present invention, there is provided an air-cooling/tempering method for a glass plate for air-cooling and tempering the glass plate by blowing air to an upper face and a lower face of the glass plate transferred sequentially by means of a transferring means through air-blowing heads disposed along the transferring means wherein the air-blowing head has an air-blowing area which is divided into a plurality of areas along the transferring direction of the transferring means, and wherein a step of blowing air from all divided areas when the entirety of the glass plate is transferred into the air-blowing area of the air-blowing head, a step of stopping the blowing of air in the order of areas through which the glass plate is passed, a step of reopening the blowing of air from the all divided areas when the entirety of the next glass plate is transferred into the areas to which the blowing of air is stopped, and a step of stopping the blowing of air in the order of areas through which the glass plate is passed, are repeated sequentially.

According to this, when the entirety of the glass plate transferred by the transferring means is transferred between the upper and lower air-blowing heads, air is blown from all the areas. Then, with the transfer of the glass plate, the blowing of air is sequentially stopped in the order of areas through which the glass plate is passed, and another glass plate to be subsequently air-cooled and tempered is transferred to the areas to which the blowing of air is stopped. Accordingly, time intervals for transferring glass plates can be shortened, and the glass plates can effectively be air-cooled and tempered.

Further, according to an aspect of the present invention, there is provided an air-cooling/tempering method for a glass plate for air-cooling and tempering the glass plate by blowing air to an upper face and a lower face of the glass plate transferred sequentially by means of a transferring means through air-blowing heads disposed along the transferring means, wherein the air-blowing area of the air-blowing heads is divided into a plurality of areas along the transferring direction of the transferring means, and air is blown from only the air-blowing area of the area which corresponds to the position of the glass plate during the transfer when the entirety of the glass plate is transferred into the air-blowing area of the air-blowing head.

According to this, when the entirety of the glass plate transferred by the transferring means is transferred into the air-blowing area of the air-blowing head, air is blown from only the air-blowing head of the area corresponding to the position of the glass plate during the transfer. With this, time intervals for transferring glass plates can be shortened, and the glass plates can effectively be air-cooled and tempered.

BEST MODE FOR CARRYING OUT THE INVENTION

Preferred embodiments of the air-cooling/tempering device and the air-cooling/tempering method for a glass plate according to the present invention will be described in detail with reference to the attached drawings.

Figure 1:
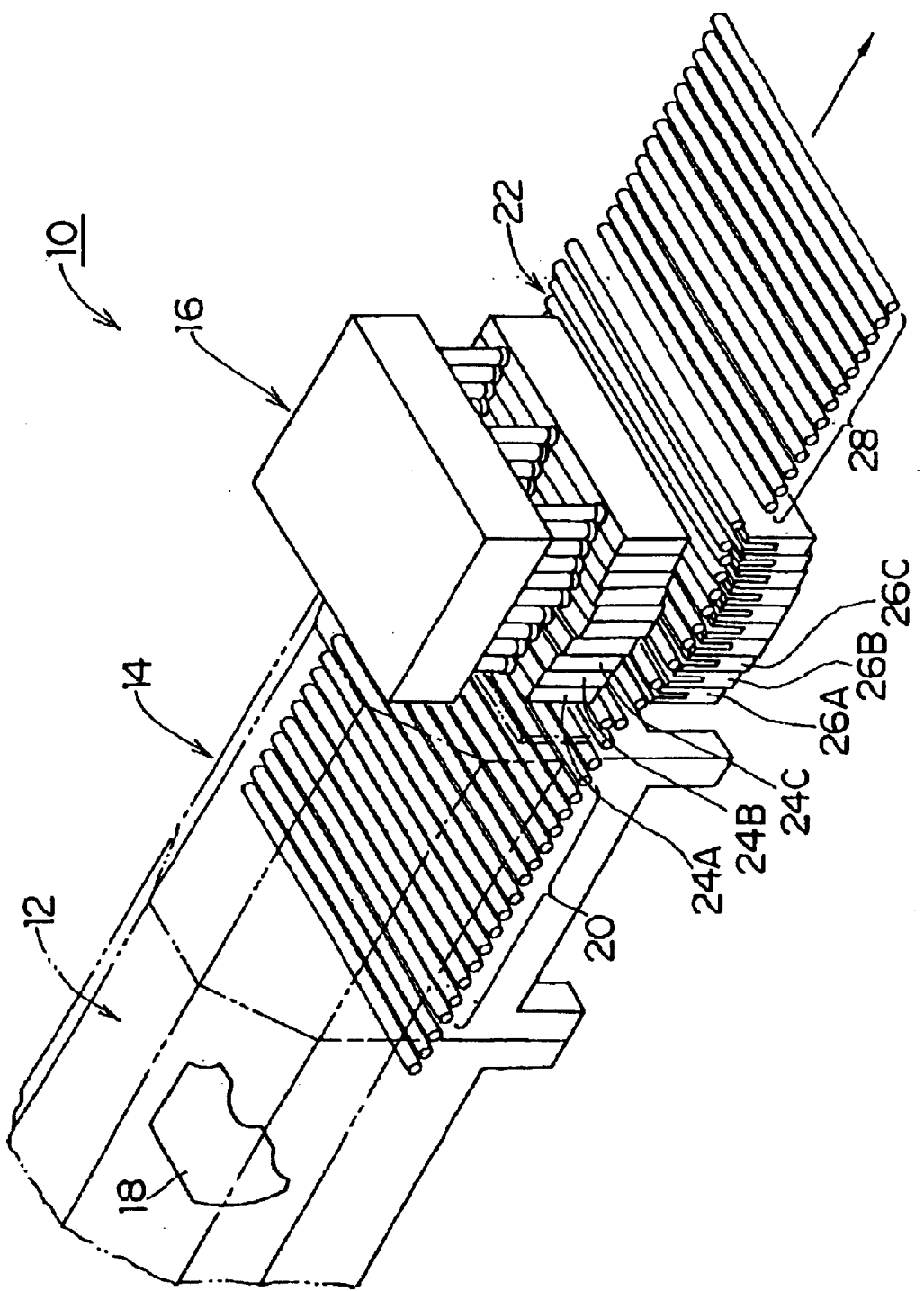
FIG. 1 is a perspective view showing the construction of a glass plate bend-shaping line in which the air-cooling/tempering device of the present invention is assembled.

FIG. 1 is a perspective view showing the construction of a glass plate bend-shaping line in which the air-cooling/ tempering device of the present invention is assembled. With reference to FIG. 1, description will be made as to a general flow in bend-shaping processes for a glass plate.

A glass plate 18 before being bend-shaped is transferred into a heating furnace 12 by means of a transferring roller conveyor (not shown) after the position for transfer has been determined at an inlet port of the heating furnace 12. Then, it is heated to a predetermined bend-shaping temperature (about 600–700° C.) while it is transferred in the heating furnace 12.

The glass plate 18 heated to the predetermined bend-shaping temperature is placed on a bend-shaping roller conveyor 20 and is transferred into a shaping zone 14. In the process of the transfer in the shaping zone 14, a predetermined bend-shaping operation is conducted by the bend-shaping roller conveyor 20.

Subsequently, the glass plate 18 subjected to the predetermined bend-shaping operation is moved onto an air-cooling/tempering roller conveyor 22. Then, by the air-cooling/tempering roller conveyor 22, the glass plate is transferred into an air-cooling/tempering device 16.in which air-cooling and tempering are effected.

The air-cooled and tempered glass plate 18 is moved onto a delivering roller conveyor 28 and is transferred to an inspection device (not shown) as the next step.

As described above, the glass plate is bend-shaped to have a predetermined curvature in the shaping zone 14, and then, is air-cooled and tempered in the air-cooling/tempering device 16.

Figure 2:
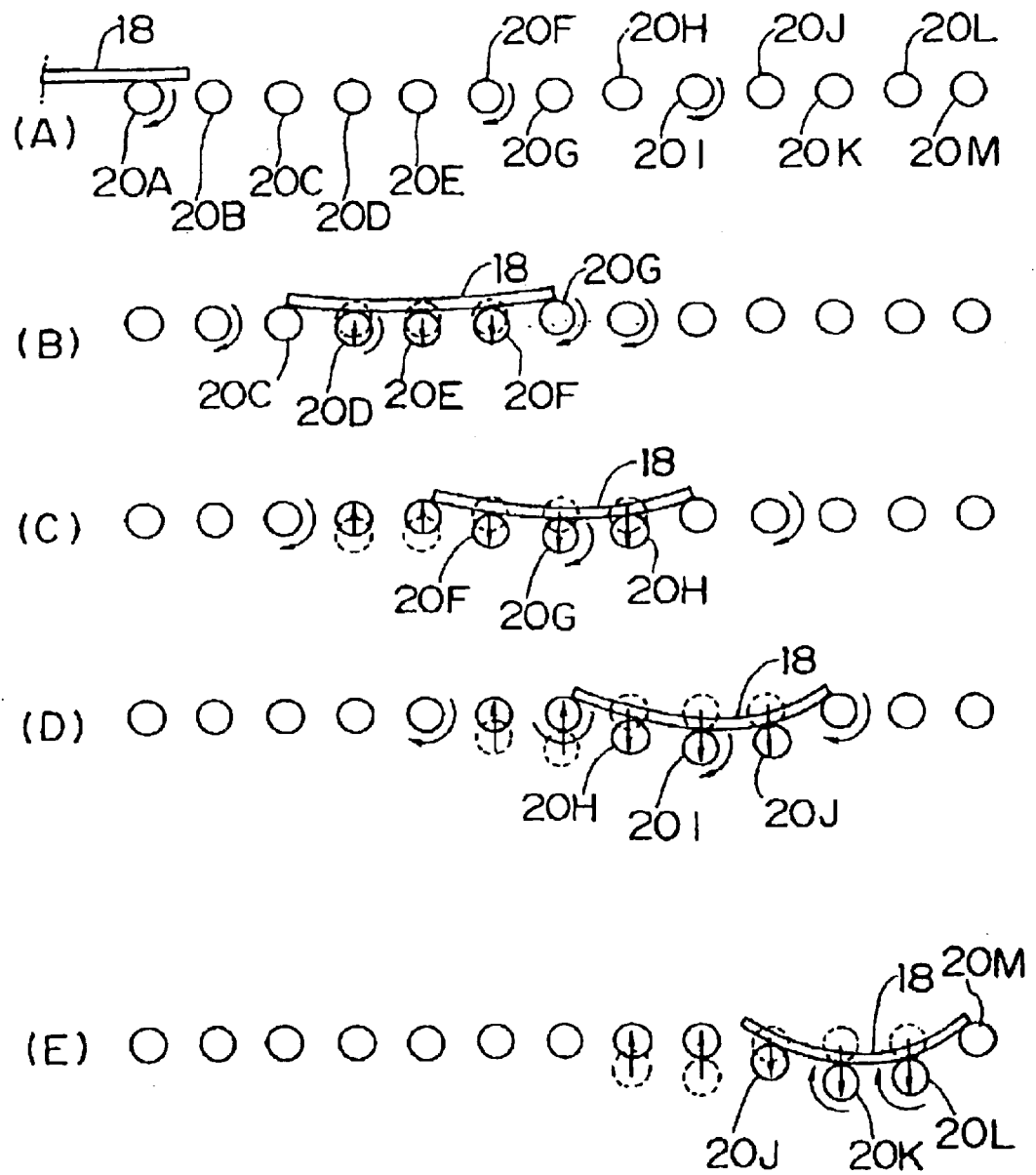
FIG. 2 is a transition diagram showing operations of bending a glass plate by means of roller conveyors.

Next, the construction of the shaping zone 14 will be described. First, the construction of the bend-shaping roller conveyor 20 disposed in the shaping zone 14 will be described with reference to FIGS. 1 and 2.

The bend-shaping roller conveyor 20 comprises a plurality of rollers 20A, 20B, . . . having a straightened form, and each of the rollers 20A, 20B, . . . is arranged horizontally in parallel to a transferring direction with predetermined intervals therebetween. With the rotation of these rollers 20A, 20B, . . . , the glass plate 18 is transferred on a transferring plane formed by these rollers 20A, 20B, . . . . Each of the rollers 20A, 20B, constituting the roller conveyor 20 is rotated independent from each other by means of a rotating/driving means, and at the same time, it is moved in a vertical direction independently by means of a vertical direction driving means.

In the following, each construction of the rotating/driving means and the vertical direction driving means will be described. The rotating/driving means and the vertical direction driving means for each roller 20A, 20B, have the same construction. Accordingly, the constructions of the rotating/driving means and the vertical direction driving means for only the roller 20A will be explained for convenience, and description of the constructions for other rollers 20B, 20C, . . . is omitted.

Figure 3:
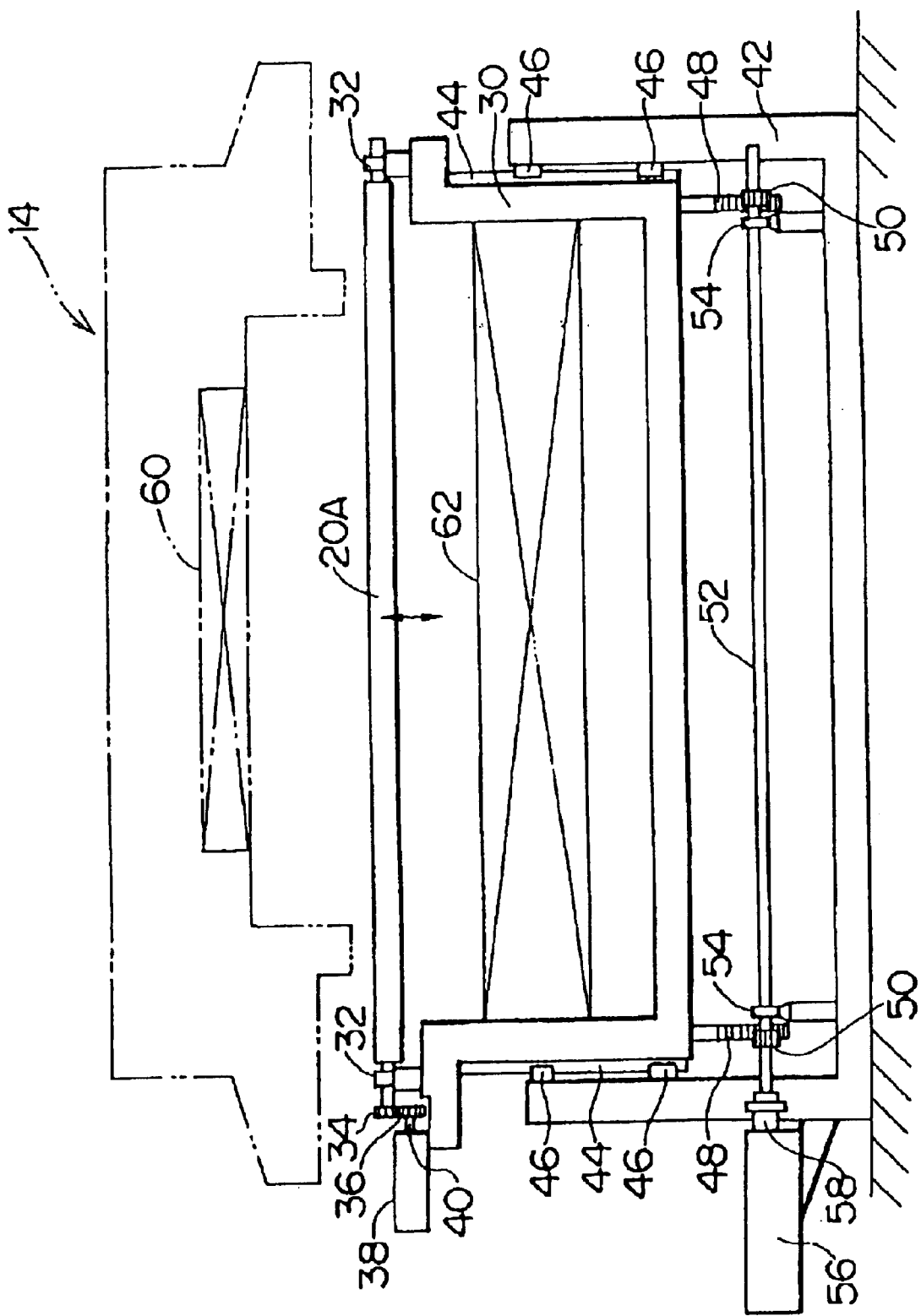
FIG. 3 is a diagram showing the constructions of a roller rotating/driving means and a vertical direction driving means.

First, the construction of the rotating/driving means will be described. As shown in FIG. 3, the roller 20A has both ends supported rotatably by bearings 32, 32 disposed on a vertically movable frame 30 so as to be rotatable. A driven gear 34 is fixed to an end (a left end in FIG. 3) of the roller 20A, and the driven gear 34 is meshed with a driving gear 36. The driving gear 36 is attached to a spindle 40 of a servomotor 38 mounted on the vertically movable frame 30. The roller 20A is rotated at a predetermined angular speed by driving the servomotor 38. The construction of the rotating/driving means is as above.

Next, the construction of the vertical direction driving means will be described. As shown in FIG. 3, the vertically movable frame 30 is supported by a fixed frame 42 so as to be capable of sliding vertically. Namely, guide rails 44, 44 are arranged along a vertical direction at both sides of the vertically movable frame 30, and the guide rails 44, 44 are engaged with guide blocks 46, 46 fixed to the fixed frame 42. The vertically movable frame 30 is provided at both lower end portions with racks 48, 48 projecting toward a lower side. The racks 48, 48 are meshed with pinions 50, 50 which are fixed to a rotating shaft 52. The rotating shaft 52 has both ends supported by bearings 54, 54, and a spindle 58 of a servomotor 56 is connected to an end of it (a left end in FIG. 3). The rotating shaft 52 is rotated by driving the servomotor 56 so that a rotating motion of the shaft is changed to a linear motion by the function of the pinions 50 and the racks 48. As a result, the vertically movable frame 30 is moved in a vertical direction. With the vertical movement of the vertically movable frame 30, the roller 20A is moved vertically. The construction of the vertical direction driving means is as above.

In FIG. 3, reference numerals 60, 62 designate heaters disposed in the shaping zone 14.

The above-mentioned rotating/driving means and the vertical direction driving means are provided for all other rollers 20B, 20C, . . . . Further, the servomotors 38, 56 of these driving means are controlled by a motion controller.

When the motion controller receives information of a model for the glass plate 18 from an external input means, it produces angular speed controlling data and vertical movement controlling data on the rollers 20A, 20B, . . . so as to correspond to the curvature of the glass plate 18 of that model. Then, the controller controls the servomotors 38, based on the angular speed controlling data and controls the servomotors 56 based on the vertical movement control data. Namely, the motion controller performs multiple axis control for each of the rollers 20A, 20B, . . . so that the glass plate 18 is bend-shaped to have a predetermined curvature in the transferring direction while the glass plate is transferred by the rollers 20A, 20B, . . . .

Bend-shaping operations for the glass plate 18 by the roller conveyor 20 constructed as described above will be described by using FIG. 2. Characters in brackets in description correspond to the characters in the brackets of FIG. 2.

In an initial state, all the rollers 20A, 20B, . . . are at the highest position (A).

When the transfer of the glass plate 18 is started, rollers 20D–20F are descended (B) whereby a transferring plane formed by the rollers 20D–20F is changed into a gently curved shape having a large radius of curvature. The glass plate 18 deflects along the curved plane due to its own weight while it is passed on the rollers 20D–20F whereby the glass plate is bend-shaped along the transferring direction.

When the glass plate 18 is further transferred, rollers 20F–20H are descended further than the former rollers 20D–20F (C). Thus, the transferring plane formed by the rollers 20F–20H is deformed into a curved shape having a smaller radius of curvature than the former curved plane. The glass plate further deflects along the curved plane of the rollers 20F–20H due to its own weight while it is passed on the rollers 20F–20H, whereby it is bend-shaped along the transferring direction.

When the glass plate 18 is further transferred, rollers 20H–20J are descended further than the former roller 20F-20H (D) whereby the transferring plane formed by the rollers 20H–20J is deformed into a curved shape having smaller radius of curvature than the former curved plane.

The glass plate 18 deflects further along the curved plane of the rollers 20H–20J due to its own weight during being passed through the rollers 20H–20J, whereby the glass plate is bend-shaped along the transferring direction.

When the glass plate 18 is further transferred, rollers 20J–20L are descended further than the former rollers 20H–20J (E). Then, the transferring plane formed by the rollers 20J–20L is deformed into a curved plane having the same radius of curvature as the finally obtainable curvature of the glass plate 18. The glass plate 18 is bend-shaped to be the finally obtainable curvature along the transferring direction while it is passed on the rollers 20J–20L. The subsequent rollers 20M, . . . are moved vertically so as to maintain the curved plane having such curvature.

Thus, the roller conveyor 20 is operated so that the radius of curvature of the curved plane formed by the vertical movement of the rollers 20A, 20B, . . . is gradually reduced so that the glass plate 18 is bend-shaped along the transferring direction.

Figure 4:
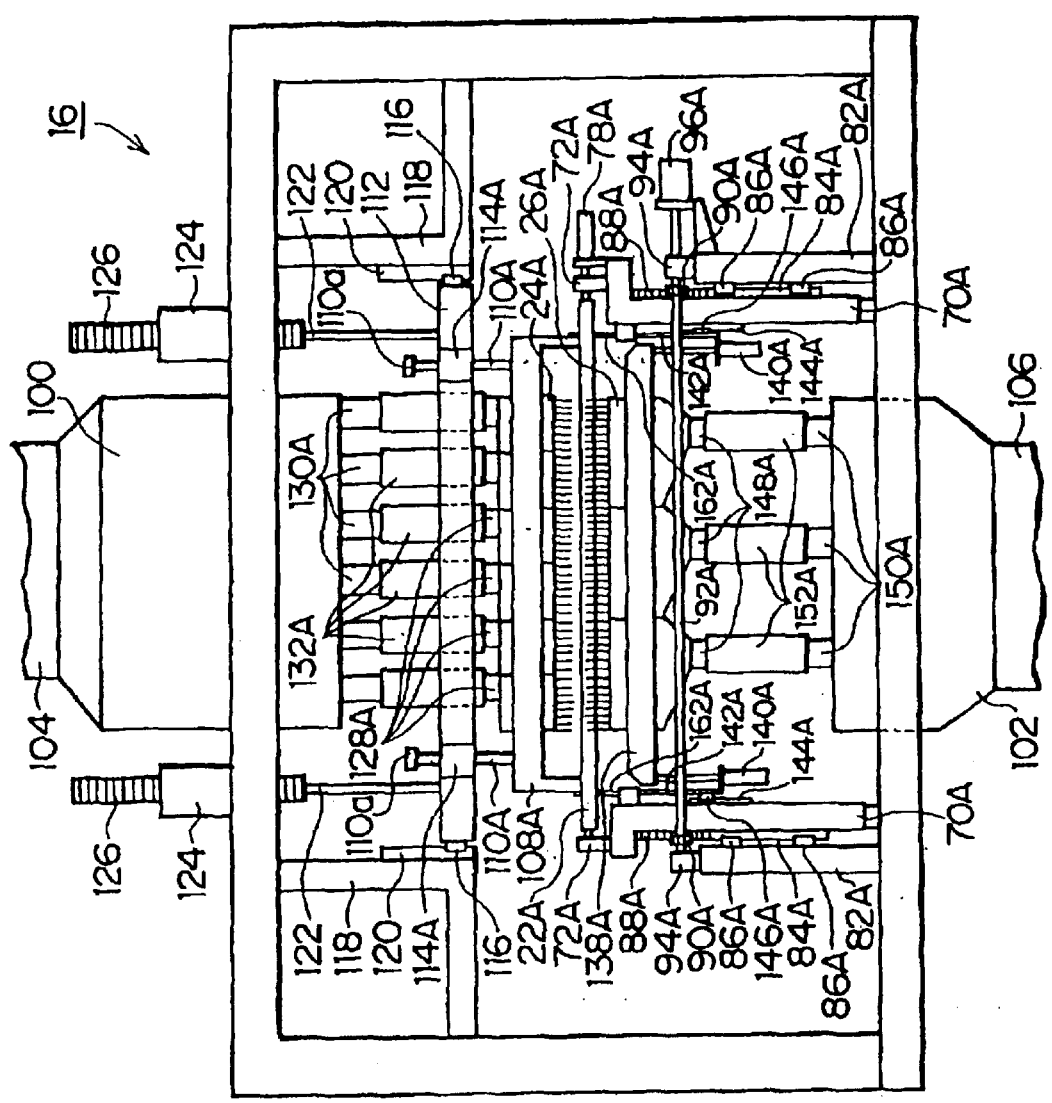
FIG. 4 is a front view showing the entire construction of the air-cooling/tempering device.
Figure 5:
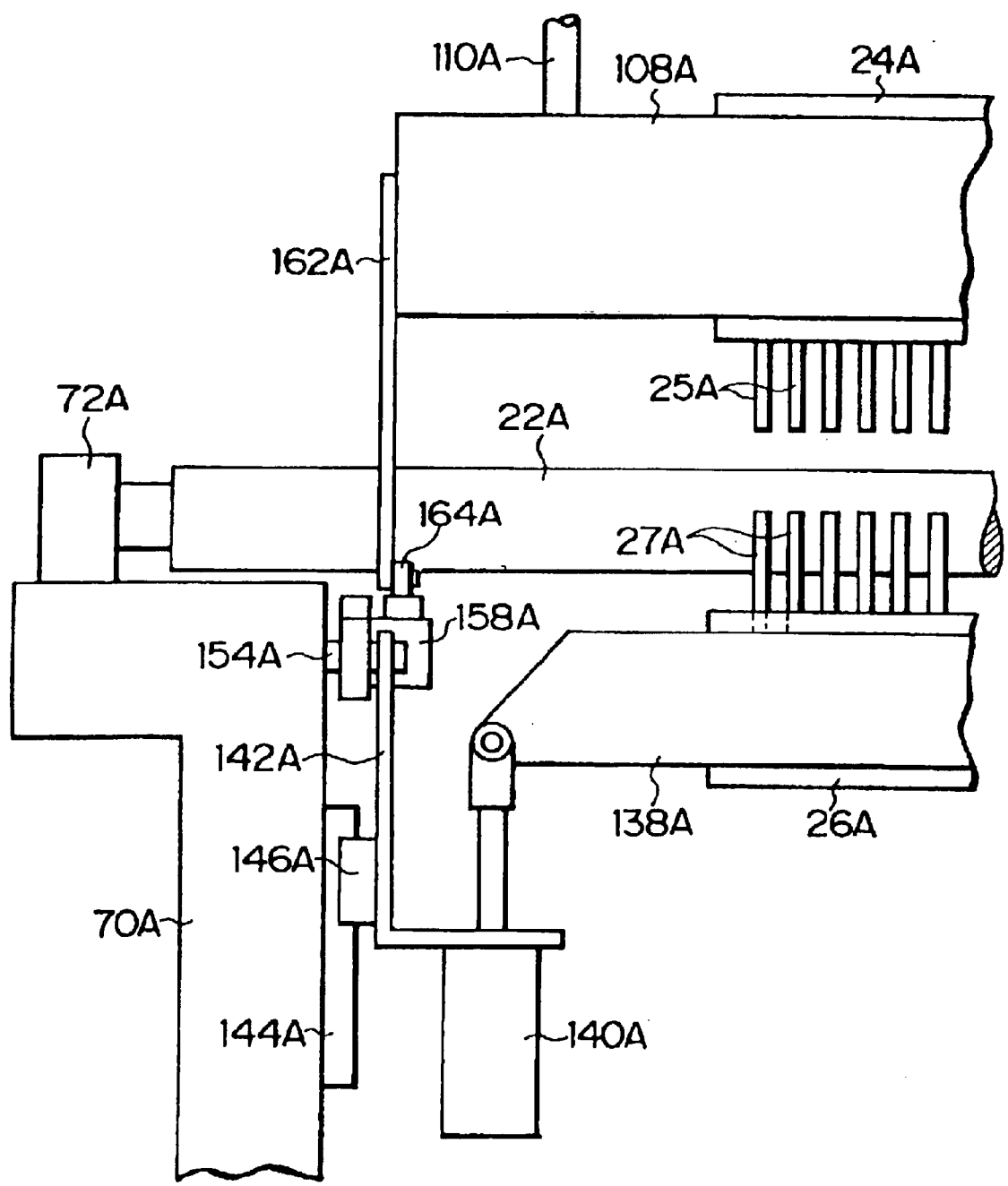
FIG. 5 is a front view showing the construction of an important portion of the air-cooling/tempering device.
Figure 6:
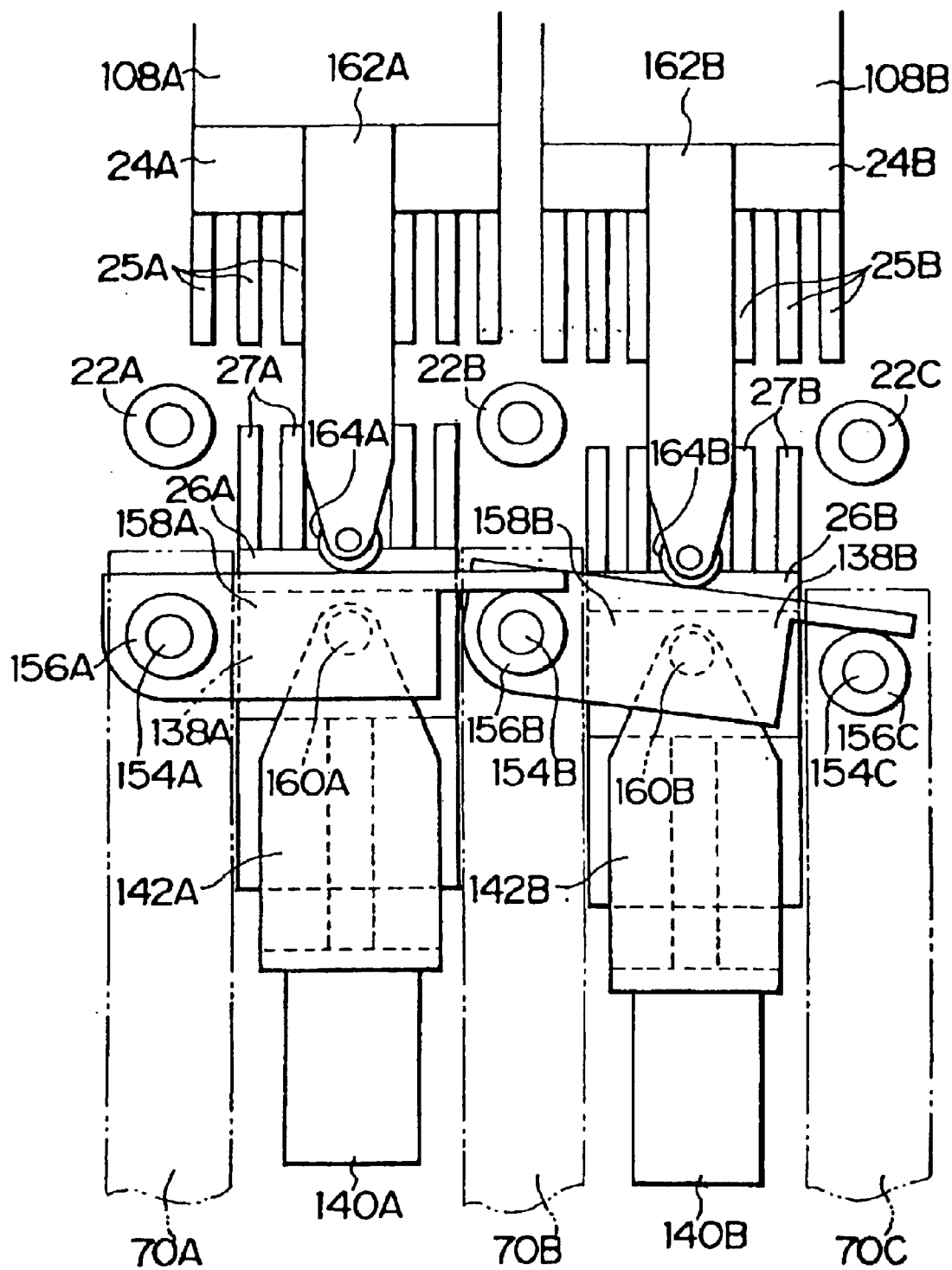
FIG. 6 is a side view showing the construction of an important portion of the air-cooling/tempering device.

The construction of the air-cooling/tempering device 16 will be described. The air-cooling/tempering device 16 cools and tempers the glass plate 18 by blowing air to an upper face and a lower face of the glass plate 18 transferred by the air-cooling/tempering roller conveyor 22. The air-cooling/tempering roller conveyor 22 is so constructed as to be moved vertically in the same manner as the bend-shaping roller conveyor 20. With reference to FIG. 4–6, the construction of the roller conveyor 22 will be described.

The roller conveyor 22 is constituted by arranging a plurality of straight rollers 22A, 22B, . . . in parallel at predetermined intervals in the transferring direction horizontally. And, each of the rollers 22A, 22B, . . . is rotated independent from each other by rotating/driving means and at the same time, is moved vertically independent from each other by means of vertical direction driving means.

In the following, the construction of the rotating/driving means and the vertical direction driving means will be described. The construction of the rotating/driving means or the vertical direction driving means for each of the rollers 22A, 22B, . . . have the same structure. Accordingly, description of only the structure of the rotating/driving means and the vertical direction driving means for the roller 20A is made for convenience, and description of the structures for other rollers 22B, 22C is omitted First, the construction of the rotating/driving means will be described. As shown in FIG. 4, the roller 22A has both ends supported rotatably by bearings 72A, 72A arranged on a pair of vertically movable frames 70A, 70A. The spindle of a servomotor 78A is connected to an end (a right end in FIG. 4) of the roller 22A. The roller 22A is rotated at a predetermined angular speed by driving the servomotor 78A. The construction of the rotating/driving means is as above.

Next, the construction of the vertical direction driving means will be described. The pair of vertically movable frames 70A, 70A are supported respectively by a pair of fixed frames 82A, 82A so as to be movable vertically. Namely, guide rails 84A are arranged along a vertical direction at outer side portions of each of the vertically movable frames 70A, and the guide rails 84A are supported by guide blocks 86A, 86A fixed to inside portions of the fixed frames 82A so as to be capable of sliding. Racks 88A, 88A are arranged in outer side portions of the vertically movable frames 70A, and pinions 90A, 90A are meshed with the racks 88A, 88A. The pinions 90A, 90A are fixed to a rotating shaft 92A which has both ends supported pivotally by bearings 94A, 94A. The spindle of a servomotor 96A disposed at the top of one of the fixed frames 82A is connected to an end (a right end in FIG. 4) of the rotating shaft 92A. The rotating shaft 92A is rotated by driving the servomotor 96A so that a rotating motion of it is changed to a linear motion by the function of the pinions 90A and the racks 88A. As a result, the vertically movable frames 70A are moved in a vertical direction. With the vertical movement of the vertically movable frames 70A, the roller 22A is moved in a vertical direction. The construction of the vertical direction driving means is as above.

The above-mentioned rotating/driving means and the vertical direction driving means are provided for all other rollers 22B, 22C, . . . . Servomotors 78A, . . . , 96A, . . . for these driving means are controlled by a motion controller.

When the motion controller receives information of a model for the glass plate 18 from an external input means, it prepares angular speed control data and vertical movement control data for the rollers 22A, 22B, . . . so as to correspond to the curvature of the glass plate 18 of the model. Then, the servomotors 78A, . . . are controlled based on the prepared angular speed control data, and the servomotors 96A . . . are controlled based on the vertical movement control data. Namely, the motion controller performs multiple axis control for each of the rollers 22A, 22B, . . . so that the glass plate 18 bend-shaped in the shaping zone 14 is transferred while the formed shape is maintained.

Next, description will be made as to the construction of the air-cooling/tempering device 16. The air-cooling/tempering device 16 is provided with an upper air-blowing box 100 at an upper side and a lower air-blowing box 102 at a lower side, which interpose the roller conveyor 22 therebetween. The upper air-blowing box 100 and the lower air-blowing box 102 are respectively connected with ducts 104, 106, and a blower, although not shown, is connected to these ducts 104, 106. Accordingly, when the blower is driven, cooling air generated by the blower is supplied to the upper air-blowing box 100 and the lower air-blowing box 102 through the ducts 104, 106.

The cooling air supplied to the upper air-blowing box 100 is blown to the roller conveyor 22 through nozzles 25A, 25B, . . . of upper blowing heads (air blowing heads at an upper side) 24A, 24B, . . . arranged at an upper side of spaces between adjacent rollers 22A, 22B, . . . . On the other hand, the cooling air supplied to the lower air-blowing box 102 is blown to the roller conveyor 22 through nozzles 27A, 27B, . . . of lower air-blowing heads (air-blowing heads at a lower side) arranged at a lower side of spaces between adjacent rollers 22A, 22B, . . . . With such, the upper face and the lower face of the glass plate 18 transferred by the roller conveyor 22 are cooled.

The upper air-blowing heads 24A, 24B, . . . and the lower air-blowing heads 26A, 26B, . . . are arranged respectively so as to be moved vertically. Further, the upper air-blowing heads 24A, 24B, . . . and the lower air-blowing heads 26A, 26B, . . . are respectively moved vertically in connection with the rollers 22A, 22B, . . . . The rollers 22A, 22B, . . . are moved vertically with the transfer of the glass plate 18. In this case, among the rollers 22A, 22B, . . . , the rollers located at the position where the glass plate 18 is transferred are moved vertically so that a transferring plane formed by the rollers at that position has a curved plane in correspondence with the curved shape of the bend-shaped glass plate in the transferring direction of the glass plate. With the transfer of the glass plate, each of the rollers are sequentially moved vertically so that the curved plane formed by the rollers is shifted to the transferring direction of the glass plate.

In the following, description will be made as to a mechanism which causes a vertical movement of the upper air-blowing heads 24A, 24B, . . . and the lower air-blowing heads 26A, 26B, . . . .

As shown in FIG. 4, the upper air-blowing head 24A is arranged along the roller 22A. The upper air-blowing head 24A is held by a holder (an upper supporting frame) 108A. The holder 108A has an upper portion on which a pair of slide rods 110A, 110A are extended vertically, and the slide rods 110A, 110A are supported by bushes 114A, 114A provided in a slide frame 112 so as to be capable of sliding. Namely, the holder 108A is supported so as to be capable of sliding in a vertical direction with respect to the slide frame 112.

The slide frame 112 has both end portions to which guide blocks 116, 116 are firmly attached. The guide blocks 116, 116 are provided so as to slide on guide rails 120, 120 mounted on fixed frames 118, 118. Namely, the slide frame 112 is supported so as to be capable of sliding in a vertical direction with respect to the fixed frames 118, 118.

Racks 126, 126 of rack jacks (upper supporting frame elevating means) 124, 124 are connected to an upper portion of the slide frame 112 by means of connecting bars 122, 122. By driving the rack jacks 124, 124, the slide frame 112 is moved in a vertical direction.

Stoppers 110a, 110a are fixed to the top of the slide rods 110A, 110A set up in the upper portion of the holder 108A. Accordingly, when the slide frame 112 is ascended, the stoppers 110a, 110a are pushed by the upper portion of the bushes 114A, 114A whereby the holder 108A is pulled up. Accordingly, the upper air-blowing head 24A is pulled up upward by the holder 108A pulled up.

The inside of the upper air-blowing head 24A is partitioned into a plurality (6 in this embodiment) of spaces, and 6 air-introducing ports 128A, 128A, formed in an upper face portion of the upper air-blowing head 24A are respectively communicated with the spaces. The 6 air-introducing ports 128A, 128A, . . . are respectively connected to air-supplying ports 130A, 130A, . . . formed in a lower face portion of the upper air-blowing box 100 through flexible pipes 132A, 132A, . . . . These flexible pipes 132A, 132A, . . . are formed flexibly so as to expand and shrink according to the vertical movement of the upper air-blowing head 24A. Accordingly, even when the upper air-blowing head 24A is moved vertically, the upper air-blowing box 100 is not moved vertically.

As described above, the upper air-blowing head 24A is supported so as to be capable of sliding in a vertical direction. Then, the upper air-blowing head 24A is pulled up by driving the rack jacks 124, 124.

On the other hand, the lower air-blowing heads 26A, 26B are arranged along the rollers 22A, 22B, respectively, and are held by holders (lower supporting frames) 138A, 138B, respectively. The holders 138A, 138B have both end portions to which rods of pairs of cylinders (lower supporting frame elevating means) 140A, 140A, 140B, 140B are connected, respectively. The cylinders 140A, 140A, 140B, 140B are respectively attached to connecting arms 142A, 142A, 142B, 142B, and the connecting arms 142A, 142A, for example, are capable of sliding on guide rails 144A, 144A disposed on inner side faces of vertically movable frames 70A, 70A via slide blocks 146A, 146A. Similarly, vertically movable frames 70B, 70C are so constructed. Accordingly, with the vertical movement of the connecting arms 142A, 142A, the lower air-blowing head 26A is moved vertically in connection with the connecting arms 142A, 142A. The head is moved vertically according to the expansion or shrinkage of the rods of the cylinders 140A, 140A when they are driven.

The inside of the lower air-blowing head 26A is partitioned into a plurality (3 in this embodiment) of spaces, and 3 air-introducing ports 148A, 148A, 148A formed in a lower face portion of the lower air-blowing head 26A are respectively communicated with the spaces. The 3 air-introducing ports 148A, 148A, 148A are respectively connected to air-supplying ports 150A, 150A, 150A formed in an upper face portion of the lower air-blowing box 102 through flexible pipes 152A, 152A, 152A. The flexible pipes 152A, 152A, 152A are formed flexibly so as to expand and shrink according to the vertical movement of the lower air-blowing head 26A. Accordingly, even when the lower air-blowing head 26A is moved vertically, the lower air-blowing box 102 is not moved vertically.

As described above, the upper air-blowing head 24A and the lower air-blowing head 26A are respectively supported so as to be capable of sliding in a vertical direction. Further, other upper air blowing heads 24B, 24C, . . . and the lower air-blowing heads 26B, 26C, are also supported so as to be capable of sliding in a vertical direction. The upper air-blowing box 100, the lower air-blowing box 102 and the slide frame 112 are used commonly.

As shown in FIGS. 5 and 6, pivot shafts 154A, 154B, . . . are respectively provided in the vicinity of an upper end portion of the vertically movable frames 70A, 70B, . . . . On these pivot shafts 154A, 154B, . . . , disk-like pieces 156A, 156B, . . . are supported on the same axial line so as to be rotatable.

Further, swing arms 158A, 158B, . . . are disposed between adjacent pivot shafts 154A, 154B, . . . , and an end of the swing arms 158A, 158B, . . . is supported respectively by one of the adjacent pivot shafts 154A, 154B, . . . so as to be rotatable. Each other end of them is placed on the piece 156B, 156C, . . . attached to the pivot shaft 154B, 154C, . . . at the other side.

Each of the pivot shafts 154A, 154B, . . . is provided on each of the vertically movable frames 70A, 70B, . . . . Accordingly, each of the pivot shafts 154A, 154B, . . . is moved vertically in connection with the vertical movement of each of the rollers 22A, 22B, . . . which form the roller conveyor 22. When a height difference takes place between each adjacent pivot shafts 154A, 154B, . . . by the vertical movement of the pivot shafts 154A, 154B, the swing arms 158A, 158B, . . . are inclined in response to degrees of the height difference.

An upper end portion of the connecting arms 142A, 142B, . . . to which the lower air-blowing heads 26A, 26B, . . . are connected, is connected to a central portion of the swing arms 158A, 158B, . . . by means of pins 160A, 160B, . . . respectively. Accordingly, by a swing movement of the swing arms 158A, 158B, . . . , the connecting arms 142A, 142B, . . . are moved vertically according to an amount of inclination of the swing arms 158A, 158B, . . . . Then, the vertical movement of the connecting arms 142A, 142B, . . . causes the vertical movement of the lower air-blowing heads 26A, 26B, . . . .

On the other hand, driven arms 162A, 162B, . . . are attached to both end portions of the holders 108A, 108B, . . . by which the upper air-blowing heads 24A, 24B, . . . are held (FIG. 4). On the end portion of the driven arms 162A, 162B, . . . , rollers 164A, 164B, . . . are respectively provided rotatably as shown in FIGS. 5 and 6. These rollers 164A, 164B, . . . are positioned at a central portion of the swing arms 158A, 158B, . . . respectively. Accordingly, a swing motion of the swing arms 158A, 158B, . . . causes a vertical movement of the driven arms 162A, 162B, . . . according to an amount of inclination of the swing arms 158A, 158B, respectively. Then, the vertical movement of the driven arms 162A, 162B, . . . causes the vertical movement of the upper air-blowing heads 24A, 24B, . . . .

As described above, the upper air-blowing heads 24A, 24B, . . . and the lower air-blowing heads 26A, 26B, are moved vertically in connection with the vertical movement of each of the rollers 22A, 22B, . . . which form the roller conveyor 22. The amount of movement of each roller is ½ of a different in height of adjacent roller 22A, 22B, . . . . Namely, since the connecting arms 142A, 142B, . . . and the driven arms 162A, 162B, . . . are respectively connected to an intermediate position of the swing arms 158A, 158B, . . . , when a difference of height takes place between each adjacent rollers 22A, 22B, . . . they move by a distance of ½ of the difference in height. As a result, the upper air-blowing heads 24A, 24B, . . . and the lower air-blowing heads 26A, 26B, . . . are always kept to an intermediate level position between adjacent rollers 22A, 22B, . . . .

The function of the air-cooling/tempering device 16 having the above-mentioned construction in this embodiment is as follows.

First, initial setting is conducted. Namely, rack jacks 124A, 124A are driven to descend the slide frame 112 to a predetermined operational position (the position shown in FIG. 4). With this, each of the holders 108A, 108B, . . . are supported to be movable vertically, and at the same time, the rollers 164A,. 164B, . . . of the driven arms 162A, 162B, . . . are respectively placed on the swing arms 158A, 158B, . . . . As a result, each of the upper air-blowing heads 24A, 24B, . . . is moved vertically in connection with the swing motion of the swing arms 158A, 158B, . . . .

Further, the cylinders 140A, 140B, . . . are simultaneously driven to ascend the lower air-blowing heads 26A, 26B, . . . respectively so that each of the nozzles 27A, 27B, . . . is positioned to a position of a predetermined distance apart from the transferring plane of the roller conveyor 22.

Figure 7:
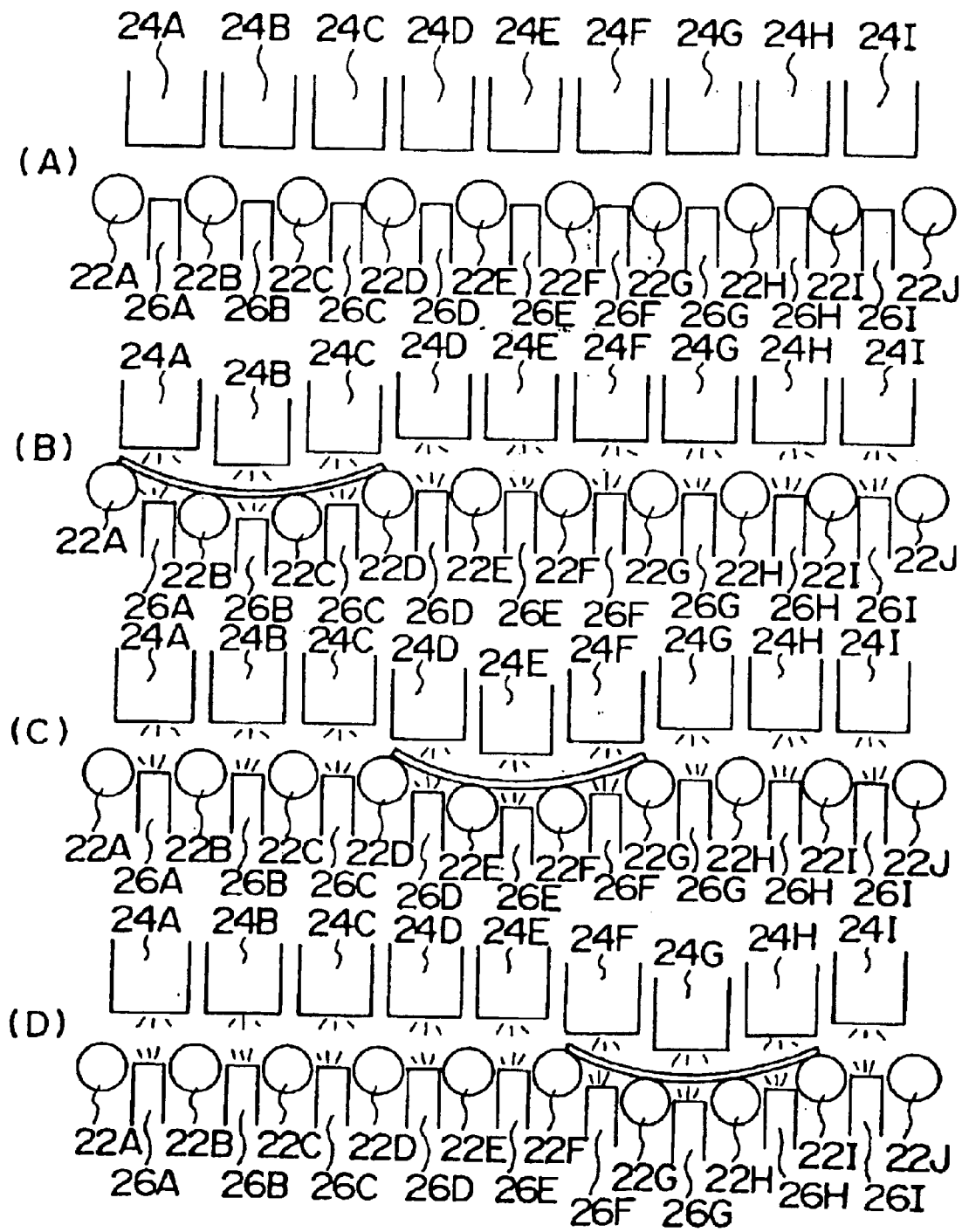
FIG. 7 is a transition diagram for explaining the function of the air-cooling/tempering device.

After the above-mentioned initial setting has been finished, the bend-shaping of the glass plate 18 is started. Description concerning the bend-shaping method of the glass plate 18 in the shaping zone 14 has already been made. Accordingly, only a process for air-cooling and tempering the bend-shaped glass plate 18 will be described with reference to FIG. 7.

The glass plate 18 bend-shaped in the shaping zone 14 is transferred from the bend-shaping roller conveyor 20 to the air-cooling/tempering roller conveyor 22.

As shown in FIG. 7(A), all the rollers 22A, 22B, . . . constituting the roller conveyor 22 are located at the highest position in a state previous to the glass plate 18 being transferred thereon. Accordingly, the transferring plane is flat, and each of the upper air-blowing heads 24A, 24B, . . . and lower air-blowing heads 26A, 26B, . . . are positioned at the same height level.

When the glass plate 18 is transferred from the bend-shaping roller conveyor 20 to the air-cooling/tempering roller conveyor 22, and the glass plate 18 is entered into the air-cooling/tempering device 16, the blower (not shown) is driven so that cooling air is blown to the glass plate 18 through the nozzles 25A, 25B, . . . of the upper air-blowing heads 24A, 24B, . . . and the nozzles 27A, 27B, . . . of the lower air-blowing heads 26A, 26B, . . . . Then, the glass plate 18 is air-cooled and tempered by the cooling air blown from the nozzles 25A, 25B, . . . of the upper air-blowing heads 24A, 24B, . . . and the nozzles 27A, 27B, . . . of the lower air-blowing heads 26A, 26B, . . . .

In the roller conveyor 22 for transferring the glass plate 18, each of the rollers 22A, 22B, . . . transfers the glass plate 18 while the rollers are moved vertically so as to maintain the shape of the bend-shaped glass plate 18 as shown in FIGS. 7(B)–(D).

On the other hand, with the vertical movement of the rollers 22A, 22B, . . . transferring the glass plate 18, the upper air-blowing heads 24A, 24B, . . . and the lower air-blowing heads 26A, 26B, . . . which are arranged for the roller 22A, 22B, . . . are moved vertically in connection with the vertical movement of the rollers. In this case, the upper air-blowing heads 24A, 24B, . . . and the lower air-blowing heads 26A, 26B, . . . are moved vertically so that they are always positioned at an intermediate level between each adjacent rollers 22A, 22B, . . . .

As described above, in the air-cooling/tempering device 16 of this embodiment, the upper air-blowing heads 24A, 24B, . . . and the lower air-blowing heads 26A, 26B, . . . are moved in connection with the vertical movement of the rollers 22A, 22B, . . . of the roller conveyor 22. In this case, the upper air-blowing heads 24A, 24B, . . . and the lower air-blowing heads 26A, 26B, . . . are moved vertically so that they are always positioned at an intermediate level between adjacent rollers 22A, 22B, . . . . With such arrangement, the distance from the transferred glass plate 18 to the nozzles 25A, 25B, . . . , 27A, 27B, . . . of the blowing heads 24A, 24B, . . . , 26A, 26B, . . . can be kept to be substantially constant whereby uniform cooling performance can be provided.

Further, in the air-cooling/tempering device 16 of this embodiment, even when a trouble happens during the air-cooling/tempering of the glass plate 18, there is an advantage that the upper air-blowing heads 24A, 24B, . . . and the lower air-blowing heads 26A, 26B, . . . can quickly be retracted with respect to the transferring plane.

Namely, when a trouble happens during the air-cooling and tempering, for example, the rotation of the rollers 22A, 22B, . . . of the roller conveyor 22 is stopped first. Then, the rack jacks 124, 124 are driven to raise the slide frame 112. By raising the slide frame 112, the stoppers 110a, 110a of the slide rods 110A, 110B, . . . provided in each of the holders 108A, 108B, . . . are pushed by the upper surface of the bushes 114A, 114B, . . . provided in the slide frame 112, whereby each of the holders 108A, 108B, . . . are raised. By raising each of the holders 108A, 108B, . . . , the upper air-blowing heads 24A, 24B, . . . are raised simultaneously whereby they are retracted with respect to the transferring plane of the roller conveyor 22.

Further, at the same time of driving the rack jacks 124, 124, each of the cylinders 140A, 140B, . . . are driven to shrink its rod, whereby each of the lower air-blowing heads 26A, 26B, . . . is lowered so that the air-blowing heads are retracted with respect to the transferring plane of the roller conveyor 22.

Thus, according to the air-cooling/tempering device 16 of this embodiment, even when a trouble happens during the air-cooling and tempering of the glass plate 18, the upper air-blowing heads 24A, 24B, . . . and the lower air-blowing heads 26A, 26B, . . . can quickly be retracted with respect to the transferring plane, hence, the trouble can be coped with quickly.

Figure 8:
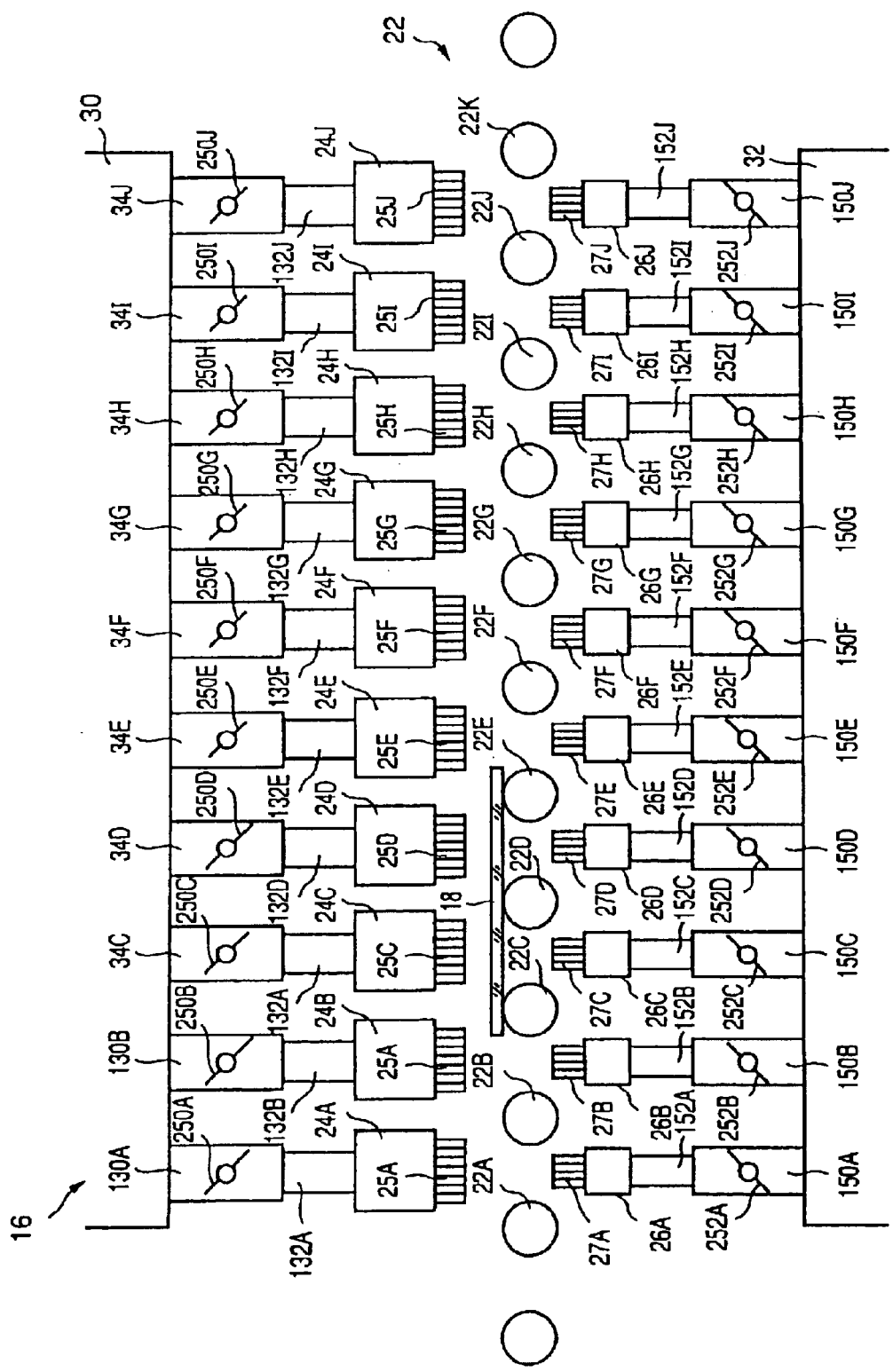
FIG. 8 is a side view showing the construction of an important portion of the air-cooling/tempering device.

Next, a preferred sequence in the air-cooling/tempering method of the present invention will be described. As shown in FIG. 8, dampers 250A, 250B, . . . , 252A, 252B, . . . are respectively provided at air supplying ports 130A, 130B, . . . , 150A, 150B, . . . formed in air-blowing boxes 30, 32. The dampers 250A, 250B, 252A, 252B, . . . are controlled independently to be opened and closed by means of a controller (not shown) respectively. Air is supplied to each of the air-blowing heads 24A, 24B, . . . , 26A, 26B, . . . by opening the dampers 250A, 250B, . . . , 252A, 252B, . . . , and the supply of air is stopped by closing the dampers. Thus, the air blowing area of each of the air blowing heads 24A, 24B, . . . , 26A, 26B, . . . is divided.

The air-blowing heads 24A, 24B, . . . , 26A, 26B, are arranged to be movable vertically, and they are moved vertically in connection with the movement of each of the rollers 22A, 22B, . . . of the roller conveyor 22 by means of a link mechanism (not shown).

Figure 9:
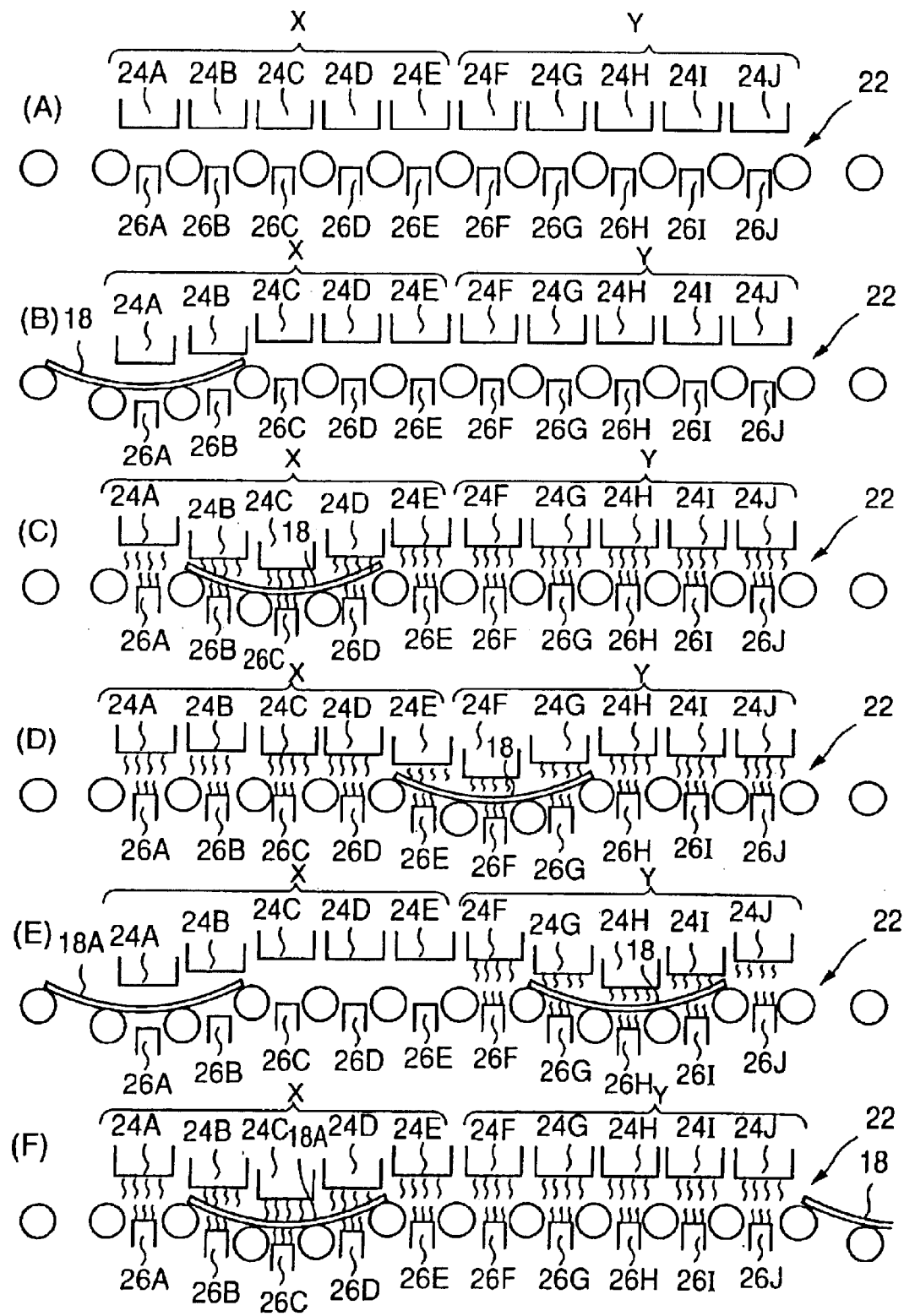
FIG. 9 is a diagram of the function of the air-cooling/tempering method for a glass plate according to a first embodiment of the present invention.

The air-cooling/tempering device 16 is constructed as described above. The first embodiment of the air-cooling/tempering method of the present invention using such air-cooling/tempering device 16 is as follows. In the description of the construction of the device, FIG. 8 shows the glass plate 18 wherein its curved shape is omitted. Accordingly, the air-cooling/tempering method is described by using FIG. 9.

As described before, the air-cooling/tempering device 16 is so adapted as to divide the air blowing area by controlling the dampers 250A, 250B, . . . , 252A, 252B, . . . to be opened and closed by means of the controller. As shown specifically in FIG. 9(A), the air blowing area is divided at an intermediate point of the roller conveyor 22 into the first area X at an upstream side and the second area Y at a downstream side, whereby air can selectively be blown in three ways: the first area X at an upstream side, the second area Y at a downstream side, and all the areas XY of the roller conveyor 22.

FIGS. 9(A)–9(F) show an air-cooling/tempering method in a time series of (A)→(F). Characters in brackets in the following description correspond to characters in brackets in FIG. 9.

Each of the rollers 22A, 22B, . . . of the roller conveyor 22 before the glass plate 18 is transferred thereon is located at the highest position (A).

When the bend-shaped glass plate 18 is transferred on the air-cooling/tempering roller conveyor 22, the air-cooling/tempering roller conveyor 22 transfers the glass plate 18 into the air-cooling/tempering device 16 while the rollers 22A, 22B, . . . are moved vertically so as to maintain the shape of the glass plate 18 (B). When the entirety of the glass plate 18 is transferred in the first area X, air is blown to the roller conveyor 22 through the air-blowing heads 24A–24J, 26A–26J of the whole areas XY (C). In the course that the glass plate 18 is passed through the upper and lower air-blowing heads 24A–24J, 26A–26J, air is blown to the upper and lower faces whereby the glass plate is air-cooled and tempered (D).

When the glass plate 18 transferred by the roller conveyor 22 is passed through the first area X as shown in FIG. 9(E), the blowing of air through the air-blowing heads 24A–24E, 26A–26E belonging to the first area X is stopped. Then, in the course that the glass plate 18 is air-cooled and tempered in the second area Y, another glass plate 18A to be air-cooled and tempered next is transferred into the first area X. When the entirety of the glass plate 18A is transferred in the first area X, the blowing of air through the air-blowing heads 24A–24E, 26A–26E of the first area X is again started as shown in FIG. 9(F) whereby the air-cooling and tempering of the glass plate 18A is started.

In the same manner as the above above, when the glass plate 18A is passed through the first area X, the blowing of air through the air-blowing heads 24A–24E, 26A–26E belonging to the first area X is stopped. Then, another glass plate 18" to be air-cooled and tempered next is transferred into the first area X to which the blowing of air is stopped.

Thus, by dividing the air blowing area into two portions in the transferring direction, the glass plate 18A to be air-cooled and tempered next can be transferred into the air-cooling/tempering device 16 while the air-cooling and tempering of the glass plate 18 which has been transferred into the air-cooling/tempering device 16, can be conducted. With this, the interval of glass plates 18 transferred subsequently can be reduced whereby the glass plate 18 can effectively be air-cooled and tempered.

Figure 10:
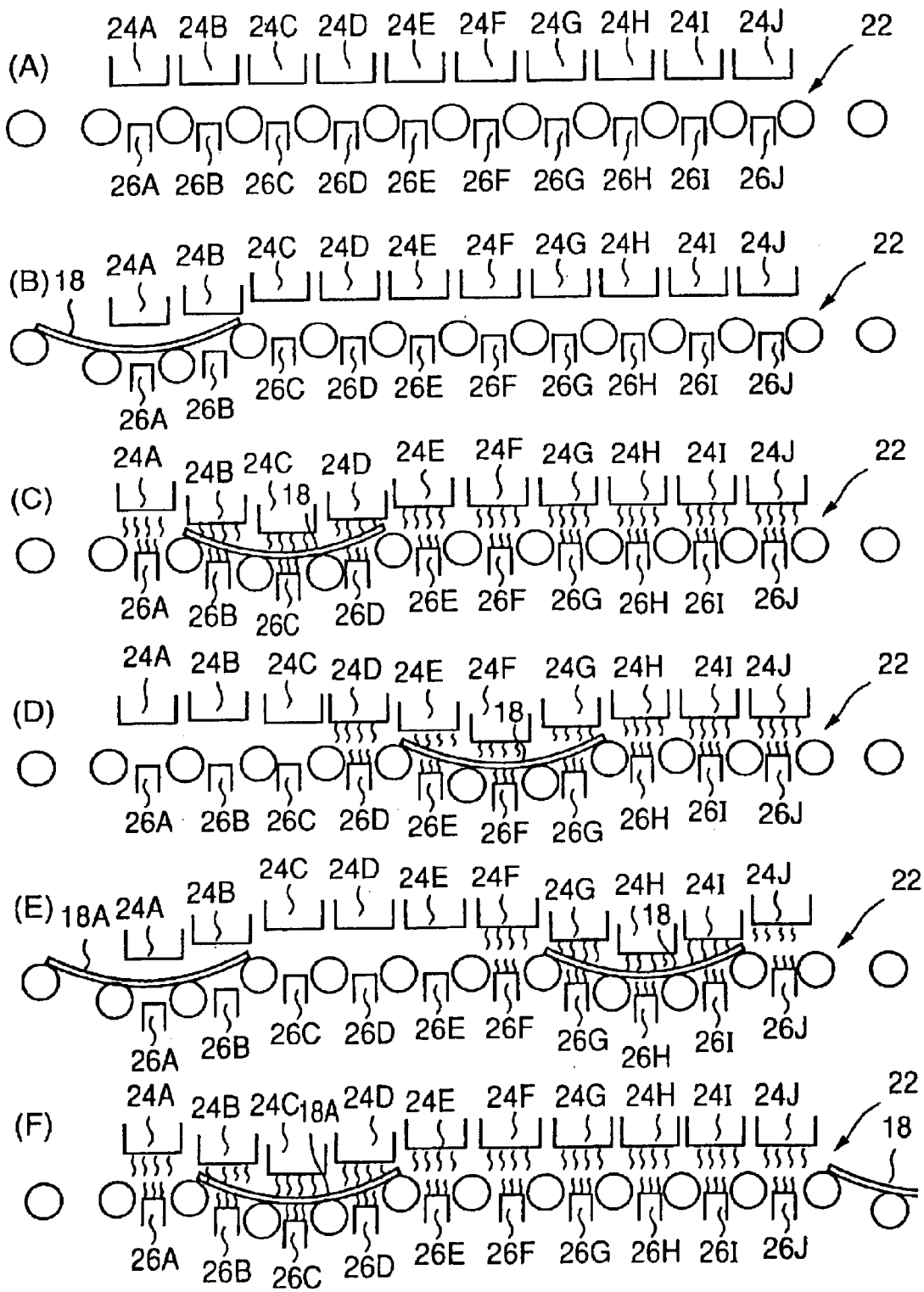
FIG. 10 is a diagram of the function of the air-cooling/tempering method for a glass plate according to a second embodiment of the present invention.

FIG. 10 is a diagram showing the function of a second embodiment of the air-cooling/tempering method of the present invention in which the above-mentioned air-cooling/tempering device 16 is used. In the description on the function of the second embodiment, characters in brackets correspond to characters in brackets in FIG. 10.

Each of the rollers 22A, 22B, . . . of the roller conveyor 22 before the glass plate 18 is transferred thereon is located at the highest position (A).

When the bend-shaped glass plate 18 is transferred onto the air-cooling/tempering roller conveyor 22, the air-cooling/tempering roller conveyor 22 transfers the glass plate 18 into the air-cooling/tempering device 16 while the rollers 22A, 22B, . . . are moved vertically so as to maintain the shape of the glass plate 18 (B). When the entirety of the glass plate 18 is transferred into the air-cooling/tempering device 16, air is blown to the roller conveyor 22 through the air-blowing heads 24A–24J, 26A–26J of the whole areas (C).

As the transfer of the glass plate 18 proceeds, the air-blowing heads 24A–24J, 26A–26J stop the blowing of air in the order of areas through which the glass plate 18 is passed (D). Then, another glass plate 18A to be air-cooled and tempered next is transferred with a predetermined interval into the air-cooling/tempering device 16 (E). When the entirety of the glass plate 18A is transferred into the air-cooling/tempering device 16, the air-blowing heads 24A–24E, 26A–26E in the whole areas blow air again to thereby start the air-cooling and tempering of the glass plate 18A (F).

In the same manner as the above, as the transfer of the glass plate 18A proceeds, the air-blowing heads 24A–24J, 26A–26J stop the blowing of air in the order of the areas through which the glass plate 18A is passed, and another glass plate 18B to be air-cooled and tempered next is transferred with a predetermined interval into the air-cooling/tempering device 16.

Thus, by stopping the blowing of air in the order of the areas through which the glass plate 18 is passed, the glass plate 18A to be air-cooled and tempered next can be transferred into the air-cooling/tempering device 16 while the air-cooling and tempering of the glass plate 18 transferred already into the air-cooling/tempering device 16 is conducted. Accordingly, the intervals of subsequently transferred glass plates 18 can be shortened whereby the glass plates 18 can be air-cooled and tempered effectively.

Figure 11:
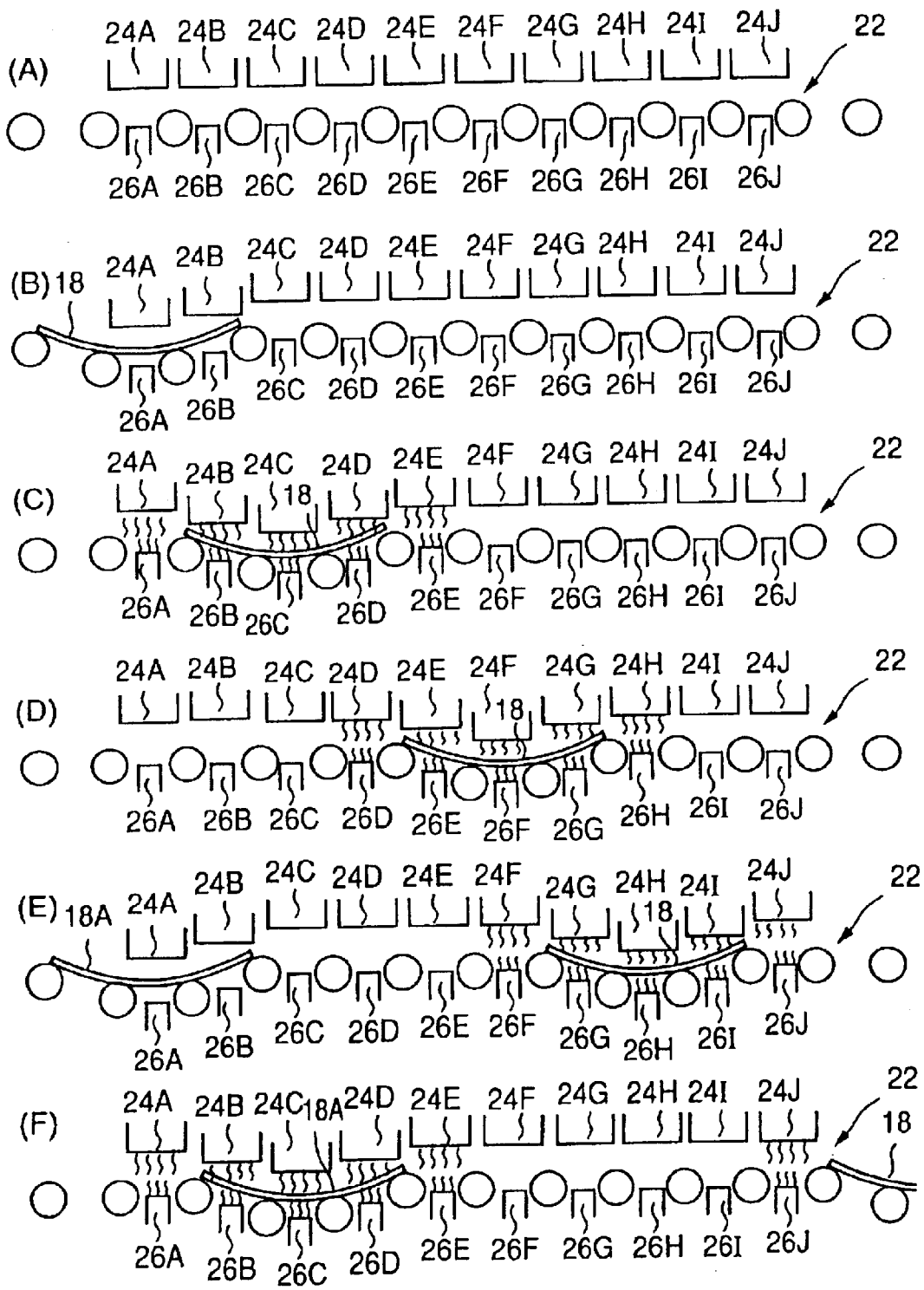
FIG. 11 is a diagram of the function of the air-cooling/tempering method for a glass plate according to a third embodiment of the present invention.

FIG. 11 is a diagram showing the function of a third embodiment of the air-cooling/tempering method of the present invention in which the above-mentioned air-cooling/tempering device 16 is used. In the description of the function of the third embodiment, characters in brackets correspond to characters in brackets in FIG. 11.

Each of the rollers 22A, 22B, . . . of the roller conveyor 22 before the glass plate 18 is transferred thereon is located at the highest position (A).

When the bend-shaped glass plate 18 is transferred on the air-cooling/tempering roller conveyor 22, the air-cooling/tempering roller conveyor 22 transfers the glass plate 18 into the air-cooling/tempering device 16 while the rollers 22A, 22B, . . . are moved vertically so as to maintain the shape of the glass plate 18 (B). When the entirety of the glass plate 18 is transferred into the air-cooling/tempering device 16, air is blown to the roller conveyor 22 through the air-blowing heads 24A–24E, 26A–26E in the area corresponding to the position of the glass plate 18 ((C), (D)).

As described before, air is blown from only the area where the glass plate 18 is located, and air is not blown from the other areas. Accordingly, air is not blown from the areas before and after the position where the glass plate 18 is located. To the area to which air is not blown, another glass plate 18A to be air-cooled and tempered next is transferred with a predetermined interval (E). When the entirety of the glass plate 18A is transferred into the air-cooling/tempering device 16, air is blown to the roller conveyor 22 through the air-blowing heads 24A–24E, 26A–26E of the area corresponding to the position where the glass plate 18 is located, whereby the air-cooling and tempering of the glass plate 18A is started (F).

Thus, by blowing air from only the area where the glass plate 18 is located, the glass plate 18A to be air-cooled and tempered next can be transferred into the air-cooling/tempering device 16 in the process of air-cooling and tempering of the glass plate 18 transferred already in the air-cooling/tempering device 16. With this, intervals of subsequently transferred glass plates 18 can be shortened whereby the glass plates 18 can effectively be air-cooled and tempered.

As described above, according to the air-cooling/tempering method of the above-mentioned embodiments, the intervals of subsequently transferred glass plates 18 can be shortened whereby the glass plates 18 can effectively be air-cooled and tempered. The air-cooled and tempered glass plates 18 are transferred from the air-cooling/tempering roller conveyor 22 to the delivering roller conveyor 28 to be transferred to an inspection device (not shown) at the next step.

In the embodiment shown in FIG. 1, the shaping zone 14 is formed in the hood of the heating furnace 12. Specifically, the shaping zone 14 is formed in the heating furnace 12 at a downstream side of the heating furnace 12. In the bend-shaping apparatus for a glass plate in the present invention, (i) the shaping zone may be formed in the heating furnace or (ii) it may be formed out of the heating furnace or (iii) a part of the shaping zone may be formed out of the heating furnace. The location of the shaping zone can properly be selected among the above-mentioned (i)–(iii) depending on dimensions and a curved shape of the glass plate.

First, the relation of a position of the shaping zone to a thickness of a glass plate will be described. A tempering treatment after the glass plate has been bend-shaped is influenced by a thickness of the glass plate. Namely, a compression stress is produced in the surfaces of the glass plate and a tensile stress is produced in the inside thereof after the tempering treatment. These residual stresses are derived from a temperature difference between the surfaces of the glass plate and the inside of the glass plate, which is resulted from the rapidly cooling of heating glass plate. Since it is difficult to cause such temperature difference in a case of a glass plate having a smaller thickness, it is necessary to increase cooling performance at the time of rapidly cooling when a glass plate having a smaller thickness is to be tempered. As one of measures to increase the cooling performance, there is a way of increasing a blowing pressure or an air quantity of cooling air. Alternatively, there is a way of increasing a temperature of glass plate at the time of rapidly cooling.

In the case of (i), a glass plate after having been bend-shaped can immediately be transferred into the air-cooling/tempering device because the glass plate can be bend-shaped in the heating furnace. Accordingly, the glass plate can be transferred into the air-cooling/tempering device without causing a reduction of the temperature of the glass plate. Accordingly, the arrangement of the shaping zone in (i) is advantageous when the glass plate having a smaller thickness is bend-shaped and tempered.

Next, the relation of the position of the shaping zone to a curved shape of the glass plate will be described. In bend-shaping a glass plate into a shape curved in plural directions (a complexly curved shape), means for bend-shaping the glass plate in a direction perpendicular to the transferring direction is provided in the shaping zone. If such means is provided in the heating furnace, it is difficult to maintain a closed space in the heating furnace whereby there occurs the disadvantage that temperature in the heating furnace can not be maintained to a predetermined value. In view of this, a stabilized temperature in the heating furnace can be realized by providing such means outside the heating furnace. Accordingly, the arrangement of the shaping zone in (ii) is advantageous in a case of bend-shaping the glass plate to have a complexly curved shape.

Further, for bend-shaping/tempering processing for bend-shaping a glass plate having a smaller thickness to have a complexly curved shape, (iii) is advantageous as a compromise of (i) and (ii). The arrangement of the bend-shaping zone of (iii) is preferable not only in merely the viewpoint of the compromise but also in the following point. Namely, for a demand of small quantity-large variety of products in automobile industries, there is a need for bend-shaping glass plates of many models with a single glass plate bend-shaping apparatus. There are a variety of glass plates of different thickness depending on models. Accordingly, it is advantageous if glass plates having a variety of thickness and a variety of curved shape can be formed with a single glass plate bend-shaping apparatus. The arrangement of the shaping zone applicable to such demand of small quantity and variety of products is the arrangement of (iii).

As a bend-shaping method or apparatus prior to air-cooling and tempering a glass plate, various one can be used in the present invention regardless of whether or not they have been known or unknown. For example, there is a method or an apparatus wherein a lower peripheral surface of a heated glass plate is supported by a ring, and the glass plate is held between a shaping mold disposed at an upper surface side of the glass plate and such ring to be bend-shaped. Further, there is such bend-shaping methods or apparatus as explained in the above-mentioned embodiments. In either method or apparatus, the glass plate is transferred into the air-cooling/tempering device by the roller conveyor after the glass plate has been bend-shaped. In particular, the bend-shaped methods or apparatus as explained in the above-mentioned embodiments are preferable by the reasons as described below.

Namely, as already described, it is preferable that the glass plate is bend-shaped in a direction along the transferring direction from the viewpoint of strain resulted in the glass plate. As a method for bend-shaping in the direction along the transferring direction, there is the '326 method. In this method, however, the glass late is transferred in a vertical direction with respect to a horizontal plane. Accordingly, the entire equipment becomes large. Further, since the glass plate is transferred against gravity, it is difficult to transfer the glass plate at a high speed, and it is necessary to provide, in particular, means for preventing the glass plate from slipping on the rollers. Further, it is necessary that the transferring direction of the glass plate, which has been subjected to bend-shaping and air-cooling/tempering, has to be changed from a vertical direction to a horizontal direction. Means for changing the transferring direction are complicated and there is fear of occurrence of a flaw in the glass plate.

On the other hand, according to the bend-shaping methods and apparatus explained on the above-mentioned embodiments, glass plates of different model can be shaped by changing only vertical movement control data on the rollers. Further, the transferring direction of the glass plate is horizontal, and accordingly, the occurrence of a flaw in the glass plate can be suppressed. Thus, the bend-shaping methods and apparatus explained on the above-mentioned embodiments are bend-shaping methods and apparatus having a simple structure as a whole in the equipment, which can bend-shape the glass plate in a direction along the transferring direction. Accordingly, as the bend-shaping methods and apparatus for a glass plate, used prior to the air-cooling and tempering of the glass plate in the present invention, the examples described in the above-mentioned embodiments are preferable.

Since the bend-shaping methods and apparatus for a glass plate described in the above-mentioned embodiments are preferred, it is preferable in the present invention to constitute the transferring means for transferring the glass plate into the air-cooling/tempering device with a plurality of rollers which cause a vertical movement in a vertical direction depending on a position of the glass plate transferred. Hereinbelow, the reason why preferable will be described in more detail.

In the case of transferring a glass plate by rollers, a so-called roller strain is resulted by the contact of the glass plate with the rollers. Each of the rollers extends in a direction perpendicular to the transferring direction, and is arranged adjacently in the transferring direction. Therefore, the roller strain is resulted in a stripe form in a direction perpendicular to the transferring direction.

Usually, it is difficult to find such roller strain by human eyes, and is never hindered due to the roller strain in use. However, the roller strain is seldom found depending on states of use and light incident into the glass plate. For example, when a glass plate is assembled to an automobile, a stripe-like strain extending in a vertical direction of the glass plate in the assembled state is apt to be visible in comparison with a stripe-like strain extending in a horizontal direction in the assembled state. Accordingly, it is preferable to make the transferring direction of the glass plate to be bend-shaped coincident with a horizontal direction in the assembled state.

On the other hand, when a glass plate is bend-shaped along the transferring direction, the thickness in apparent of the glass plate viewed from a direction of the frontage of the air-cooling/tempering device becomes large. Accordingly, it is necessary to keep the frontage to be large in conventional air-cooling/tempering devices for a glass plate. A large frontage will increase the distance between the air-blowing ports of the air-cooling/tempering device and the glass plate surface to thereby reduce the cooling performance.

In comparison with this, the above-mentioned embodiments are advantageous in the following point that the glass plate is transferred by the roller conveyor capable of moving vertically, and the air-blowing heads are moved vertically with the vertical movement of the roller conveyor. Namely, the air-cooling/tempering device according to the preferred embodiment can change the vertical position of the frontage depending on a curved shape of the glass plate. In this case, the frontage of the air-cooling/tempering device for transferring the glass plate can be small, and the distance between the air-blowing heads and the glass plate surfaces can be reduced to a predetermined short value. Accordingly, the air-cooling/tempering of the glass plate can be realized without reducing the cooling performance in consideration of the occurrence of a strain in the glass plate.

The each bend-shaping roller itself and each air-cooling/tempering roller itself are moved vertically in a vertical direction with the transfer of the glass plate. By such vertical movements, a curved plane is formed by the plurality of rollers at positions where the glass plate is transferred, and the curved plane is shifted in the transferring direction of the glass plate. In other words, the curved plane corresponds to a wave-like plane; each roller corresponds to an oscillating element of a wave, and a stroke in the vertical movement of each roller corresponds to an amplitude respectively. Then, by providing a phase difference in a vertical movement of each roller so that the phase of each roller is subsequently changed to a downstream side in the transferring direction, the curved plane is shifted in the transferring direction of the glass plate as if a wave is propagated.

Thus, by moving vertically the plurality of rollers depending on a position of the glass plate transferred, the transferring plane formed by the plurality of rollers is curved, and the glass plate is transferred along the curved transferring plane. Accordingly, the present invention can omit work for exchanging rollers, which was required in conventional techniques, because the glass plate can be bend-shaped and air-cooled/tempered without using a plurality of rollers having different curvatures for treating different models. Further, since glass plates of different model can be shaped by changing only the vertical movement control data for the rollers, a job change time can substantially be eliminated.

In the vertical movement of the rollers, the transferring speed of a horizontal component of the glass plate relies on a position in a vertical direction of the rollers. When an angular speed of each of the rollers is constant, the transferring speed of a horizontal component of a roller at a lower side is higher than that of a roller at an upper side. Such an imbalance of speed will cause slippage between the rollers and the glass plate thereby resulting a defect such as damaging the glass plate. In view of this, it is preferable to provide a rotating/driving means for rotating the plurality of rollers independent from each other and to control the rotating/driving means by a control device so that the transferring speed of a horizontal component of the glass plate is equal. With such, the above-mentioned disadvantage can be eliminated and a glass plate free from a flaw is obtainable.

A desired curved plane formed by each of air-cooling/tempering rollers means a curved plane which corresponds to a curved shape of a glass plate bend-shaped in the transferring direction of the glass plate.

A desired curved plane formed by each of the bend-shaping rollers is a curved plane required according to a position of the glass plate transferred on the shaping rollers. Specifically, at the most downstream side position in the glass plate bend-shaping zone, the curved plane formed by the rollers at this position exhibits a curved shape which is substantially in coincidence with a curved shape of the glass plate finally formed in the transferring direction of the glass plate.

As an example, a curved plane formed by each of the shaping rollers positioned at an upstream side with respect to the most downstream side position has a larger radius of curvature than the curved plane formed by each of the shaping rollers at the most downstream side position. Toward an upstream side, a curved plane formed by each of the shaping rollers at a further upstream side has a further larger radius of curvature.

As another example, at any position in the glass plate bend-shaping zone, it is possible to form a curved plane, formed by each of the shaping rollers, to be a curved shape which is substantially in coincidence with a finally obtainable curved shape of the glass plate in the transferring direction. In any case, for bend-shaping the glass plate into a finally obtainable curved shape, a curved plane formed by each of the shaping rollers is a curved plane determined depending on a position where the glass plate is transferred. In this case, the curved shape is determined in consideration of the thickness of the glass plate and the temperature of the glass plate. It is preferred to construct the device so as to be able to determine appropriately as to how to change the shape of the curved plane (or as to fix a predetermined curved shape) depending on these conditions.

The glass plate does not often bend by its own weight instantaneously. Accordingly, it is desirable, from the viewpoint of transmitting sufficiently the transferring/driving force of each of the shaping rollers, that the radius of curvature of a curved plane formed by each of the shaping rollers is rendered to be a radius of curvature which is gradually reduced from the upstream side, and is rendered, at the most downstream side position, to be a finally obtainable curve shape of the glass plate.

INDUSTRIAL APPLICABILITY

As described above, since the air-cooling/tempering device for a glass plate of the present invention has the upper air-blowing heads and the lower air-blowing heads moved vertically in connection with the vertical movement of the rollers of the roller conveyor, uniform cooling performance can always be presented.

Further, according to the air-cooling/tempering device for a glass plate of the present invention wherein. glass plates are transferred by the roller conveyor capable of moving vertically and the air-blowing heads are moved vertically with the vertical movement of the roller conveyor, the position of the frontage in a vertical direction can be changed according to a curved shape of the glass plate. In this case, since the frontage for transferring the glass plate into the air-cooling/tempering device can be small, the distance between the air-blowing heads and the surfaces of the glass plate can be shortened to be a predetermined value. Accordingly, the air-cooling and tempering of the glass plate in consideration of a strain resulted in the glass plate can be realized without reducing the cooling performance.

Further, according to the present invention, intervals of transferring glass plates can be shortened and the glass plates effectively be air-cooled and tempered.

What is claimed is:

1. An air-cooling/tempering method for air-cooling and tempering a glass plate, comprising:
    providing a transferring device configured to transfer glass plates sequentially through an air-blowing area and a plurality of air-blowing heads positioned along the transferring device such that air is blown to upper faces and lower faces of the glass plates, the air-blowing area being divided into a plurality of areas along a transferring direction of the transferring device;
    stopping blowing of air in the air-blowing area at an uppermost stream area in the transferring direction from the beginning of a transfer of a glass plate into the air-blowing area;
    starting the blowing of air in the uppermost stream area when an entirety of the glass plate is transferred into the uppermost stream area; and
    stopping the blowing of air in the uppermost stream area of the air-blowing area after the entirety of the glass plate has been transferred from the uppermost stream area to a downstream side of the air-blowing area,
    wherein the transferring device comprises a plurality of tempering rollers configured to move vertically at a position where the glass plate is being transferred with the transfer of the glass plate so that a curved plane is formed in at least a portion of a transferring plane formed by the tempering rollers at the position, the curved plane being in correspondence with a curved shape of the glass plate in the transferring direction of the glass plate; the plurality of tempering rollers are configured to sequentially move vertically with the transfer of the glass plate so that the curved plane is shifted in the transferring direction of the glass plate with the transfer of the glass plate, and the plurality of air-blowing heads are each disposed between adjacent tempering rollers of the plurality of tempering rollers and configured to move vertically so as to correspond to the vertical movement of each of the plurality of tempering rollers, respectively.

2. The air-cooling/tempering method according to claim 1, wherein the plurality of areas in the air-blowing area comprises a first area at an upper stream side in the transferring direction and a second area at the downstream side thereof, and wherein the blowing of air starts in the first and second areas when the entirety of the glass plate is transferred into the first area, the blowing of air stops in the first area when the entirety of the glass plate is passed through the first area and the blowing of air restarts in the first area when an entirety of a subsequent glass plate is transferred into the first area.

3. The air-cooling/tempering method according to claim 1, wherein the blowing of air from all the plurality of areas starts when the entirety of the glass plate is transferred into the air-blowing area, the blowing of air stops in a sequential order of areas through which the glass plate is passed, the blowing of air restarts from all the plurality of areas when an entirety of a subsequent glass plate is transferred into areas to which the blowing of air is stopped, and the blowing of air stops in a sequential order of areas through which the subsequent glass plate is passed.

4. The air-cooling/tempering method according to claim 1, wherein the blowing of air is carried out from only an area which corresponds to a position of the glass plate during the transfer when the entirety of the glass plate is being transferred in the air-blowing area.

* * * * *